United States Patent
Ouchiyama et al.

(10) Patent No.: US 9,988,521 B2
(45) Date of Patent: Jun. 5, 2018

(54) POLYPHENYLENE SULFIDE RESIN COMPOSITION, PRODUCTION METHOD THEREOF AND REFLECTOR

(71) Applicants: Toray Industries, Inc., Tokyo (JP); Koito Manufacturing Co., Ltd., Tokyo (JP)

(72) Inventors: Naoya Ouchiyama, Nagoya (JP); Kei Saitoh, Nagoya (JP); Hideyuki Umetsu, Nagoya (JP); Hideki Matsumoto, Nagoya (JP); Hidetaka Anma, Shizuoka (JP); Daisuke Mochizuki, Shizuoka (JP); Hiroaki Hara, Shizuoka (JP); Masayuki Kobayashi, Shizuoka (JP)

(73) Assignees: Toray Industries, Inc. (JP); Koito Manufacturing Co., Ltd. (JP)

( * ) Notice: Subject to any disclaimer, the term of this patent is extended or adjusted under 35 U.S.C. 154(b) by 889 days.

(21) Appl. No.: 14/361,482

(22) PCT Filed: Nov. 30, 2012

(86) PCT No.: PCT/JP2012/007700
§ 371 (c)(1),
(2) Date: May 29, 2014

(87) PCT Pub. No.: WO2013/080566
PCT Pub. Date: Jun. 6, 2013

(65) Prior Publication Data
US 2014/0356630 A1    Dec. 4, 2014

(30) Foreign Application Priority Data

Dec. 1, 2011    (JP) ................................. 2011-263627

(51) Int. Cl.
| | | |
|---|---|---|
| C08K 3/34 | (2006.01) | |
| C08L 81/04 | (2006.01) | |
| C08K 5/5465 | (2006.01) | |
| C08K 5/5435 | (2006.01) | |
| C08L 79/08 | (2006.01) | |
| C08G 73/10 | (2006.01) | |

(52) U.S. Cl.
CPC .............. *C08K 5/5465* (2013.01); *C08K 3/34* (2013.01); *C08K 3/346* (2013.01); *C08K 5/5435* (2013.01); *C08G 73/1046* (2013.01); *C08K 2201/016* (2013.01); *C08L 79/08* (2013.01); *Y10T 428/31533* (2015.04)

(58) Field of Classification Search
CPC ....................................................... C08K 3/34
See application file for complete search history.

(56) References Cited

U.S. PATENT DOCUMENTS

| | | | | |
|---|---|---|---|---|
| 5,231,163 A | * | 7/1993 | Kosaka .............. | C08G 75/0222 528/210 |
| 5,252,656 A | | 10/1993 | Nonaka et al. | |
| 5,945,775 A | | 8/1999 | Ikeda et al. | |
| 7,205,354 B2 | * | 4/2007 | Kobayashi .............. | C08L 71/12 359/896 |
| 2003/0078333 A1 | | 4/2003 | Kawaguchi et al. | |
| 2009/0041968 A1 | | 2/2009 | Saitoh et al. | |
| 2009/0142566 A1 | | 6/2009 | Machida et al. | |

FOREIGN PATENT DOCUMENTS

| | | |
|---|---|---|
| EP | 0 699 706 | 3/1996 |
| EP | 0 739 936 | 10/1996 |
| JP | 04-072356 A | 3/1992 |
| JP | 09-007208 A | 1/1997 |
| JP | 2000-290504 A | 10/2000 |
| JP | 2002-249661 A | 9/2002 |
| JP | 2003-026920 A | 1/2003 |
| JP | 2004-268391 A | 9/2004 |
| JP | 2007-154167 A | 6/2007 |
| JP | 2008-075049 A | 4/2008 |
| JP | 2012-131968 A | 7/2012 |
| KR | 20070108971 A * | 11/2007 |
| WO | 2007/049571 A1 | 5/2007 |
| WO | 2007/108384 A1 | 9/2007 |

* cited by examiner

*Primary Examiner* — Vickey Nerangis

(74) *Attorney, Agent, or Firm* — DLA Piper LLP (US)

(57) ABSTRACT

A polyphenylene sulfide resin composition has excellent heat resistance, flowability and lightweight property as well as surface smoothness and impact resistance. The polyphenylene sulfide resin composition includes 1 to 30 parts by weight of a mica (b) having an aspect ratio of not less than 80, relative to 100 parts by weight of a polyphenylene sulfide resin (a).

10 Claims, No Drawings

POLYPHENYLENE SULFIDE RESIN COMPOSITION, PRODUCTION METHOD THEREOF AND REFLECTOR

TECHNICAL FIELD

This disclosure relates to a polyphenylene sulfide resin composition having excellent heat resistance, flowability and lightweight property, as well as surface smoothness and impact resistance, a production method thereof and a reflector with a metal layer formed on a molded product thereof

BACKGROUND

The polyphenylene sulfide (hereinafter abbreviated as "PPS") resin has favorable properties as engineering plastic, for example, excellent heat resistance, chemical resistance, electrical insulation property and moist heat resistance. Accordingly, the PPS resin is used for various electric and electronic components, mechanical components and automobile components and more specifically for products produced by injection molding and extrusion molding.

In general, with a view to improving the rigidity and the heat resistance, a fibrous filler such as glass fibers having excellent reinforcing effect is often mixed with the PPS resin for injection molding. Mixing the PPS resin with the fibrous filler is, however, likely to cause (i) reduction of the flowability and thereby deterioration of the thin-wall moldability and is simultaneously likely to cause (ii) anisotropy by filler orientation. The PPS resin mixed with the fibrous filler thus often fails to meet the latest need for downsizing and light-weighting of automobile components and electric and electronic components. Addition of the fibrous filler to the PPS resin is likely to cause (iii) float of fillers to the surface of the molded product to form minute irregularities, and in fact has limitations in development of applications to especially automobile lighting components needing the high degree of surface smoothness. It is highly demanded to improve the characteristics of (i) to (iii) described above.

There have been reports with respect to the composition obtained by mixing mica with the PPS resin. For example, JP 2000-290504 A is an application describing a resin composition including a polyphenylene sulfide resin, potassium titanate fibers, carbon fibers and mica as a plate-like filler. JP '504, however, fails to teach that the heat resistance is improved by simply adding a relatively small amount of mica having the aspect ratio of not less than 80.

JP 2007-154167 A describes a resin composition including a polyphenylene sulfide resin, synthetic mica, calcium carbonate and a granular inorganic filler. It discloses the average particle diameter of the synthetic mica, but uses only mica having relatively small aspect ratios, for example, 25 or 2. JP '167 fails to teach that the heat resistance is improved by simply adding a relatively small amount of mica having the aspect ratio of not less than 80.

JP 2008-075049 A includes a polyphenylene sulfide resin, a copolymerized polyolefin, glass fibers and mica having the weight-average particle diameter of 10 to 100 µm. JP '049 similarly fails to teach that the heat resistance is improved by simply adding a relatively small amount of mica having the aspect ratio of not less than 80.

All of JP '504, JP '167 and JP '049 fail to teach that fine dispersion of at least one amorphous resin selected among polyether imide resins and polyether sulfone resins at a particle diameter of not greater than 1000 nm and control of the number of dispersed phases having the dispersed particle diameter of not less than 1000 nm to be not greater than 1.0% of the total number of dispersed phases improve the surface appearance and the impact resistance as well as the heat resistance and suppress warpage deformation.

It could therefore be helpful to provide a polyphenylene sulfide resin composition having excellent heat resistance, flowability and lightweight property, as well as surface smoothness and impact resistance, a production method thereof and a reflector with a metal layer formed on a molded product thereof.

SUMMARY

We found that mixing mica having the aspect ratio of not less than 80 with a PPS resin remarkably improves the heat resistance even in the case of a small mixing amount of mica and provides a PPS resin composition of good thin-wall moldability without deteriorating the flowability, the surface smoothness and the low specific gravity-based light-weighting effect.

We thus provide:
1. A polyphenylene sulfide resin composition, comprising: 1 to 30 parts by weight of a mica (b) having an aspect ratio of not less than 80, relative to 100 parts by weight of a polyphenylene sulfide resin (a).
2. The polyphenylene sulfide resin composition described in 1, wherein the mica (b) has the aspect ratio of not less than 100 and not greater than 200.
3. The polyphenylene sulfide resin composition described in either 1 or 2, wherein the mica (b) has a volume-average particle diameter of not greater than 30 µm.
4. The polyphenylene sulfide resin composition described in any of 1 to 3, wherein the polyphenylene sulfide resin (a) has a non-Newtonian index N which is calculated by Equation (1) and satisfies $1.25 \leq N \leq 1.40$ under a condition of an orifice L/D=10 at 320° C.:

$$SR = K \cdot SS \cdot N \quad (1)$$

(wherein L represents length of an orifice; D represents diameter of the orifice; N represents the non-Newtonian index; SR represents a shear rate (1/second); SS represents a shear stress (dyne/cm$^2$); and K represents a constant).
5. The polyphenylene sulfide resin composition described in any of 1 to 4, further comprising: 1 to 100 parts by weight of at least one amorphous resin (c) selected among polyether imide resins and polyether sulfone resins; and 1 to 30 parts by weight of a compatibilizer (d) having at least one group selected among an epoxy group, an amino group and an isocyanate group, wherein the polyphenylene sulfide resin forms a continuous phase (sea phase) and the amorphous resin (c) forms dispersed phases (island phases) where the amorphous resin (c) is dispersed in a number-average dispersed particle diameter of not less than 1 nm but less than 1000 nm, in morphology, and a number of dispersed phases having a dispersed particle diameter of not less than 1000 nm is equal to or less than 1.0% of a total number of dispersed phases.
6. A production method of the polyphenylene sulfide resin composition described in 5 melt-kneads the polyphenylene sulfide resin (a) with the amorphous resin (c) and the compatibilizer (d) and subsequently further melt-kneads with the mica (b).
7. A molded product is produced by molding the polyphenylene sulfide resin composition described in any of 1 to 5.
8. A reflector is produced by forming a metal layer on the molded product described in 7.

We improve the heat resistance by mixing mica having the aspect ratio of not less than 80 with a PPS resin and accordingly has no need to mix a large amount of mica. We thus provide a PPS resin composition of good thin wall moldability without deteriorating the flowability, the surface smoothness and the material specific gravity. A molded product produced from the polyphenylene sulfide resin composition has high heat resistance and extremely good surface smoothness and is effectively used for a reflector with a metal layer such as automobile lighting components.

DETAILED DESCRIPTION (a) Polyphenylene Sulfide Resin

The PPS resin (a) may be a polymer having a repeating unit shown by the following structural formula:

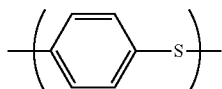

In terms of the heat resistance, the PPS resin is preferably a polymer having 70 mol % or more or further specifically having 90 mol % or more of the repeating unit shown by the above structural formula. The PPS resin (a) may be configured, such that less than about 30 mol % of its repeating unit is comprised of, for example, repeating units having the following structures:

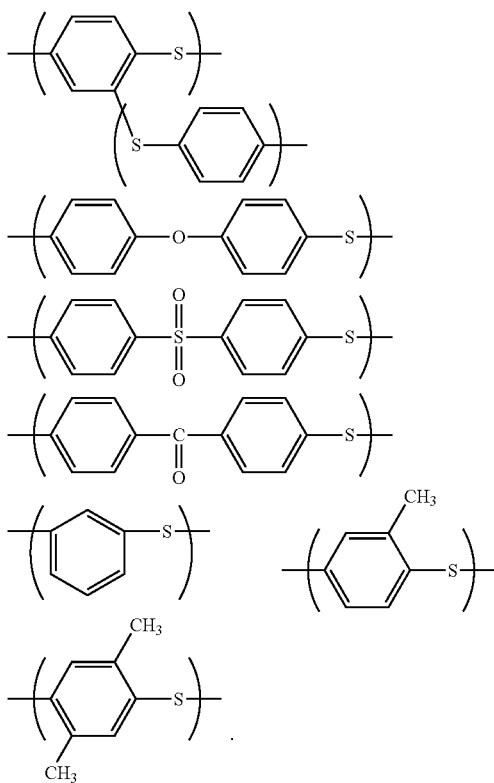

A PPS copolymer partly including the above structures has a low melting point so that a resin composition of this PPS copolymer has an advantage in moldability.

The melt viscosity of the PPS resin (a) need not be specifically limited, but in terms of readily obtaining a thin-wall injection molded product, is preferably not higher than 300 Pa·s (300° C., shear rate: 1000/s), is more preferably not higher than 200 Pa·s, is furthermore preferably not higher than 100 Pa·s. The lower limit is preferably not lower than 1 Pa·s, in terms of the melt molding processability and the gas emission.

The melt viscosity is a measured value using Capilograph manufactured by Toyo Seiki Seisaku-sho, Ltd. under the conditions of 300° C. and shear rate of 1000/s.

The following describes a production method of the PPS resin (a), but the following method is not at all restrictive and may be replaced by any other method that can produce the PPS resin (a) having the above structure.

First, the following describes the details of a polyhalogenated aromatic compound, a sulfidizing agent, a polymerization solvent, a molecular weight modifier, a polymerization modifier and a polymerization stabilizer used in the production method.

Polyhalogenated Aromatic Compound

The "polyhalogenated aromatic compound" is a compound having two or more halogen atoms in one molecule. Specific examples of the polyhalogenated aromatic compound include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene and 1-methoxy-2,5-dichlorobenzene, and p-dichlorobenzene is used preferably. Additionally, two or more different polyhalogenated aromatic compounds may be used in combination to form a copolymer. This copolymer preferably has a p-dihalogenated aromatic compound as the major component.

In terms of obtaining the PPS resin (a) having the viscosity suitable for processing, the lower limit of the used amount of the polyhalogenated aromatic compound is not less than 0.9 mol, is preferably not less than 0.95 mol and is more preferably not less than 1.005 mol per 1 mol of the sulfidizing agent. The upper limit is not greater than 2.0 mol, is preferably not greater than 1.5 mol and is more preferably not greater than 1.2 mol per 1 mole of the sulfidizing agent.

Sulfidizing Agent

The sulfidizing agent may be, for example, an alkali metal sulfide, an alkali metal hydrosulfide or hydrogen sulfide.

Specific examples of the alkali metal sulfide include lithium sulfide, sodium sulfide, potassium sulfide, rubidium sulfide, cesium sulfide and mixtures of two or more of these alkali metal sulfides. Among them, sodium sulfide is preferably used. Any of these alkali metal sulfides may be used as a hydrate or an aqueous mixture or in the form of an anhydride.

Specific examples of the alkali metal hydrosulfide include sodium hydrosulfide, potassium hydrosulfide, lithium hydrosulfide, rubidium hydrosulfide, cesium hydrosulfide and mixtures of two or more of these alkali metal hydrosulfides. Among them, sodium hydrosulfide is preferably used. Any of these alkali metal hydrosulfides may be used as a hydrate or an aqueous mixture or in the form of an anhydride.

The alkali metal sulfide used may be produced in situ in the reaction system from an alkali metal hydrosulfide and an alkali metal hydroxide. Additionally, the alkali metal sulfide may be produced from an alkali metal hydrosulfide and an alkali metal hydroxide and may be transferred to a polymerization tank to be used.

Alternatively, the alkali metal sulfide used may be produced in situ in the reaction system from an alkali metal hydroxide such as lithium hydroxide or sodium hydroxide and hydrogen sulfide. Additionally, the alkali metal sulfide may be produced from an alkali metal hydroxide such as lithium hydroxide or sodium hydroxide and hydrogen sulfide and may be transferred to a polymerization tank to be used.

When there is a partial loss of the sulfidizing agent due to, for example, a dehydration operation prior to a start of polymerization reaction, the amount of the "fed" sulfidizing agent indicates a remaining amount of the sulfidizing agent determined by subtracting the loss from an actual fed amount.

Besides, an alkali metal hydroxide and/or an alkaline earth metal hydroxide may be used together with the sulfidizing agent. Preferable examples of the alkali metal hydroxide specifically include sodium hydroxide, potassium hydroxide, lithium hydroxide, rubidium hydroxide, cesium hydroxide and mixtures of two or more of these alkali metal hydroxides. Specific examples of the alkaline earth metal hydroxide include calcium hydroxide, strontium hydroxide and barium hydroxide. Among them, sodium hydroxide is preferably used.

When the alkali metal hydrosulfide is used as the sulfidizing agent, it is especially preferable to use an alkali metal hydroxide simultaneously. The lower limit of the used amount of the alkali metal hydroxide is not less than 0.95 mol, is preferably not less than 1.00 mol and is more preferably not less than 1.005 mol per 1 mol of the alkali metal hydrosulfide. The upper limit is not greater than 1.20 mol, is preferably not greater than 1.15 mol and is more preferably not greater than 1.100 mol.

Polymerization solvent

An organic polar solvent is preferably used as the polymerization solvent. Specific examples include: N-alkyl pyrrolidones such as N-methyl-2-pyrrolidone and N-ethyl-2-pyrrolidone; caprolactams such as N-methyl-$\epsilon$-caprolactam; aprotic organic solvents such as 1,3,-dimethyl-2-imidazolidinone, N,N-dimethylacetamide, N,N-dimethylformamide, hexamethylphosphoric triamide, dimethyl sulfone and tetramethylene sulfoxide; and mixtures thereof. Any of these polymerization solvents has the high reaction stability and is thus used preferably. Among them, N-methyl-2-pyrrolidone (hereinafter may be abbreviated as NMP) is especially preferably used.

The lower limit of the used amount of the organic polar solvent is not less than 2.0 mol, is preferably not less than 2.25 mol and is more preferably not less than 2.5 mol per 1 mol of the sulfidizing agent. The upper limit is not greater than 10 mol, is preferably not greater than 6.0 mol and is more preferably not greater than 5.5 mol.

Molecular Weight Modifier

For the purpose of, for example, forming terminals of the resulting PPS resin (a), controlling the polymerization reaction or modifying the molecular weight, a monohalogenated compound (not necessarily aromatic compound) may be used as a molecular weight modifier, with the polyhalogenated aromatic compound described above.

Polymerization Modifier

One preferable aspect uses a polymerization modifier to obtain the PPS resin (a) having a relatively high degree of polymerization in a shorter time. The "polymerization modifier" herein means a substance having the function of increasing the viscosity of the resulting PPS resin (a). Specific examples of this polymerization modifier include organic carboxylates, water, alkali metal chlorides, organic sulfonates, alkali metal sulfates, alkaline earth metal oxides, alkali metal phosphates and alkaline earth metal phosphates. Any of these polymerization modifiers may be used alone, or alternatively two or more of these polymerization modifiers may be used simultaneously. Among the above substances, organic carboxylates, water and alkali metal chlorides are preferable. More specifically, alkali metal carboxylates are more preferable as the organic carboxylate, and lithium chloride is more preferable as the alkali metal chloride.

The alkali metal carboxylate is a compound expressed by a general formula $R(COOM)_n$ (in the formula, R represents an alkyl group, a cycloalkyl group, an aryl group, an alkyl aryl group or an aryl alkyl group containing 1 to 20 carbon atoms; M represents an alkali metal selected among lithium, sodium, potassium, rubidium and cesium; and n represents an integral number of 1 to 3). The alkali metal carboxylate may be used as a hydrate, an anhydride or an aqueous solution. Specific examples of the alkali metal carboxylate include lithium acetate, sodium acetate, potassium acetate, sodium propionate, lithium valerate, sodium benzoate, sodium phenylacetate, potassium p-toluate and mixtures thereof.

The alkali metal carboxylate may be obtained by mixing and reacting substantially the same chemical equivalents of an organic acid and one or more compounds selected among the group consisting of alkali metal hydroxides, alkali metal carbonates and alkali metal bicarbonates. Among the above alkali metal carboxylates, the lithium salts have high solubility in the reaction system and significant modifier effects but are expensive. Among the above alkali metal carboxylates, the potassium salts, the rubidium salts and the cesium salts are, on the other hand, likely to have insufficient solubility in the reaction system. Accordingly, sodium acetate that is less expensive and has moderate solubility in the polymerization system is most preferably used as the alkali metal carboxylate.

The amount of any of these alkali metal carboxylates used as the polymerization modifier is generally not less than 0.01 mol, is preferably not less than 0.1 mol to achieve the higher degree of polymerization, and is more preferably not less than 0.2 mol per 1 mol of the fed alkali metal sulfide. The used amount of any of these alkali metal carboxylates used as the polymerization modifier is, on the other hand, generally not greater than 2 mol, is preferably not greater than 0.6 mol to achieve the higher degree of polymerization, and is more preferably not greater than 0.5 mol per 1 mol of the fed alkali metal sulfide.

The added amount of water used as the polymerization modifier is generally not less than 0.3 mol, is preferably not less than 0.6 mol to achieve the higher degree of polymerization, and is more preferably not less than 1 mol per 1 mol of the fed alkali metal sulfide. The added amount of water used as the polymerization modifier is, on the other hand, generally not greater than 15 mol, is preferably not greater than 10 mol to achieve the higher degree of polymerization, and is more preferably not greater than 5 mol per 1 mol of the fed alkali metal sulfide.

It is also allowed as a matter of course to use two or more of these polymerization modifiers in combination. For example, using an alkali metal carboxylate and water together achieves a higher degree of polymerization by the smaller required amounts of the alkali metal carboxylate and water.

The timing of addition of any of these polymerization modifiers is not especially specified but may be any time at a pre-processing step, at the start of polymerization or in the middle of polymerization described later, and the polymerization modifier may be added in a plurality of additions. When an alkali metal carboxylate is used as the polymerization modifier, it is preferable to add the alkali metal carboxylate at once at the start of the pre-processing step or at the start of polymerization in the light of easy addition. When water is used as the polymerization modifier, on the other hand, it is effective to add water in the middle of the polymerization reaction after feeding the polyhalogenated aromatic compound.

Polymerization Stabilizer

A polymerization stabilizer may be used to stabilize the polymerization reaction system and prevent side reactions. The polymerization stabilizer contributes to stabilizing the polymerization reaction system and suppresses undesired side reactions. One of the side reactions is generation of thiophenol. Addition of the polymerization stabilizer, however, suppresses generation of thiophenol. Specific examples of the polymerization stabilizer are compounds such as alkali metal hydroxides, alkali metal carbonates, alkaline earth metal hydroxides and alkaline earth metal carbonates. Among the above compounds, alkali metal hydroxides such as sodium hydroxide, potassium hydroxide and lithium hydroxide are preferable. The alkali metal carboxylate described above also acts as the polymerization stabilizer and is thus to be included as one of the polymerization stabilizers. When the alkali metal hydrosulfide is used as the sulfidizing agent, it is especially preferable to use an alkali metal hydroxide simultaneously as described above. An excess of the alkali metal hydroxide relative to the sulfidizing agent may also serve as the polymerization stabilizer.

Any of these polymerization stabilizers may be used alone, or alternatively two or more of these polymerization stabilizers may be used in combination. The amount of the polymerization stabilizer is generally not less than 0.02 mol, is preferably not less than 0.03 mol and is more preferably not less than 0.04 mol per 1 mol of the fed alkali metal sulfide. The amount of the polymerization stabilizer is, on the other hand, generally not greater than 0.2 mol, is preferably not greater than 0.1 mol and is more preferably not greater than 0.09 mol per 1 mol of the fed alkali metal sulfide. The smaller ratio of the polymerization stabilizer has insufficient stabilization effects, while the excessively large ratio of the polymerization stabilizer is economically disadvantageous and is likely to reduce the polymer yield.

The timing of addition of the polymerization stabilizer is not especially specified but may be any time at the pre-processing step, at the start of polymerization or in the middle of polymerization described later, and the polymerization stabilizer may be added in a plurality of additions. It is, however, preferable to add the polymerization stabilizer at once at the start of the pre-processing step or at the start of polymerization, in the light of easy addition.

The following specifically and sequentially describes a pre-processing step, a polymerization reaction step, a recovery step and a post-processing step with respect to a preferable production method of the PPS resin (a). This method is, however, not restrictive at all.

Pre-processing Step

In the production method of the PPS resin (a), the sulfidizing agent is generally used in the form of a hydrate. It is here preferable to raise the temperature of a mixture including an organic polar solvent and a sulfidizing agent and remove an excess amount of water out of the system, prior to addition of a polyhalogenated aromatic compound.

When an alkali metal hydrosulfide and an alkali metal hydroxide are used as the sulfidizing agent, the sulfidizing agent used may be produced in situ in the reaction system or may be produced in a different tank from a polymerization tank. The procedure employed for such production is not specifically limited but, for example, the following procedure is preferable. The procedure adds an alkali metal hydrosulfide and an alkali metal hydroxide to an organic polar solvent under an inert gas atmosphere in a temperature range of ordinary temperature to 150° C. or preferably in a temperature range of ordinary temperature to 100° C. The procedure subsequently raises the temperature to at least 150° C. or higher or preferably to 180 to 260° C. under ordinary pressure or under reduced pressure to remove water. The polymerization modifier may be added in this preprocessing step. The reaction may be made with addition of, for example, toluene, to facilitate removal of water.

The water content in the polymerization system during the polymerization reaction is preferably 0.3 to 10.0 mol per 1 mol of the fed sulfidizing agent. The "water content in the polymerization system" means an amount determined by subtracting the amount of water removed out of the polymerization system from the amount of water fed to the polymerization system. The water fed may be in any form such as water, an aqueous solution or water of crystallization.

Polymerization Reaction Step

The PPS resin (a) is produced by reaction of the sulfidizing agent and the polyhalogenated aromatic compound in the organic polar solvent in a temperature range of not lower than 200° C. but lower than 290° C.

The polymerization reaction step starts by mixing the sulfidizing agent and the polyhalogenated aromatic compound with the organic polar solvent preferably under an inert gas atmosphere. The temperature in this step is in a temperature range of not lower than ordinary temperature or preferably not lower than 100° C. and not higher than 240° C. or preferably not higher than 230° C. The polymerization modifier may be added in this polymerization reaction step. The order of feeding these raw materials is not specifically limited.

The step then raises the temperature of the above mixture generally to a range of 200° C. to 290° C. The rate of temperature rise is not specifically limited; but the rate of not lower than 0.01° C./minute is generally selected or more preferably the rate of not lower than 0.1° C./minute as the lower limit, and the rate of not higher than 5° C./minute is generally selected or more preferably the rate of not higher than 3° C./minute as the upper limit.

In general, the step finally raises the temperature to 250 to 290° C. The reaction time at the temperature is generally not shorter than 0.25 hours or preferably not shorter than 0.5 hours as the lower limit and not longer than 50 hours or preferably not longer than 20 hours as the upper limit.

A method of raising the temperature to 270 to 290° C. after the reaction for a predetermined time at, for example, 200 to 260° C. at the stage prior to reaching to the final temperature is effective to achieve the higher degree of polymerization. Generally the range of 0.25 hours to 20 hours or preferably the range of 0.25 to 10 hours is selected as the reaction time at 200 to 260° C.

Additionally, in some cases, multi-stage polymerization may be effective to obtain a polymer having the higher degree of polymerization. The multi-stage polymerization is effective at the time when the conversion ratio of the polyhalogenated aromatic compound in the system at 245° C. reaches 40 mol % or higher or preferably 60 mol %.

The conversion ratio of the polyhalogenated aromatic compound (abbreviated as PHA herein) is a value calculated by the following equations. The remaining amount of PHA is generally determined by gas chromatography.

(A) In the case of addition of an excess in molar ratio of the polyhalogenated aromatic compound relative to the alkali metal sulfide:

Conversion ratio=[feeding amount of PHA (mol)−remaining amount of PHA (mol)]/[feeding amount of PHA (mol)−excessive amount of PHA (mol)]

(B) In the case other than the above case (A):

Conversion ratio=[feeding amount of PHA (mol)−remaining amount of PHA (mol)]/[feeding amount of PHA (mol)]

Recovery Step

In the production method of the PPS resin (a), a solid substance is recovered from a polymerization reactant including a polymer and the solvent after the end of polymerization. Any of known recovery techniques may be employed as the method of recovery.

For example, an available method may slowly cool down the polymerization reactant after the end of the polymerization reaction for recovery of a particulate polymer. This slow cooling rate is not specifically limited but is generally about 0.1° C./minute to 3° C./minute. There is no need to slowly cool down the polymerization reactant at a constant speed over the entire slow cooling step. For example, an applicable method may slowly cool down the polymerization reactant at the slow cooling rate of 0.1 to 1° C.! minute until crystallization and deposition of the polymer particles and then slowly cool down the polymerization reactant at the slow cooling rate of not lower than 1° C./minute.

One of the preferable methods performs the recovery of the solid substance described above under a rapid cooling condition. For example, a flushing method may be employed as this recovery method. The "flushing method" flushes the polymerization reactant from the state of high temperature and high pressure (generally not lower than 250° C. and not less than 8 kg/cm$^2$) into an atmosphere of ordinary pressure or reduced pressure and thereby recovers the polymer in the powdery form simultaneously with recovery of the solvent. "Flushing" herein means ejecting the polymerization reactant from a nozzle. The atmosphere into which the polymerization reactant is flushed is, for example, nitrogen or water vapor in ordinary pressure, and the range of 150° C. to 250° C. is generally selected as the flushing temperature.

Post-processing Step

The PPS resin (a) may be subject to acid treatment, hot water treatment, washing with an organic solvent, treatment with an alkali metal or treatment with an alkaline earth metal, after production through the polymerization step and the recovery step described above.

The following describes the details of acid treatment. The acid used for acid treatment of the PPS resin (a) is not specifically limited but may be any acid without the action of degrading the PPS resin (a). Available examples of the acid used for acid treatment of the PPS resin (a) include acetic acid, hydrochloric acid, sulfuric acid, phosphoric acid, silicic acid, carbonic acid and propionic acid. Among them, acetic acid and hydrochloric acid are more preferably used. An acid that degrades and deteriorates the PPS resin (a) such as nitric acid is, on the other hand, undesirable as the acid used for acid treatment of the PPS resin (a).

An available method of acid treatment is, for example, a method of soaking the PPS resin (a) in an acid or an acid aqueous solution, with adequately stirring or heating as appropriate. For example, when acetic acid is used, sufficient effects are achieved by soaking the PPS resin powder in an acetic acid aqueous solution of pH 4 heated to 80 to 200° C. and stirring the resin-soaked solution for 30 minutes. The pH after the acid treatment may be, for example, in the range of about pH 4 to 8. The PPS resin (a) subject to the acid treatment is preferably washed with water or warm water several times for removal of the remaining acid or salt. The water used for washing is preferably distilled water or deionized water, since distilled water or deionized water does not deteriorate the effects of desired chemical modification of the PPS resin (a) by acid treatment.

The following describes the details of hot water treatment. In the case of hot treatment of the PPS resin (a), the temperature of hot water is not lower than 100° C., is more preferably not lower than 120° C., is furthermore preferably not lower than 150° C. and is especially preferably not lower than 170° C. The temperature of lower than 100° C. gives little effects of desired chemical modification of the PPS resin (a) and is thus undesirable.

To achieve the effects of desired chemical modification of the PPS resin (a) by hot water washing, the water used is preferably distilled water or deionized water. The operation of hot water treatment is not specifically limited. An available method of hot water treatment is, for example, a method of heating a predetermined amount of the PPS resin (a) in a predetermined amount of water with stirring in a pressure vessel or a method of continuously performing hot water treatment. As the ratio of the PPS resin (a) to water, the greater portion of water is preferable. The liquor ratio (ratio of the weight of the PPS resin (a) to water) of not greater than 200 g of the PPS resin (a) to 1 liter of water is generally selected.

An inert atmosphere is preferably employed for the atmosphere of the treatment to avoid degradation of terminal groups. Additionally, it is preferable to wash the PPS resin (a) subject to this hot water treatment operation with warm water several times for removal of the remaining components.

The following describes the details of washing with an organic solvent. The organic solvent used for washing the PPS resin (a) is not specifically limited but may be any organic solvent without the action of degrading the PPS resin (a). Available examples of the organic solvent used for washing the PPS resin (a) include: nitrogen-containing polar solvents such as N-methyl-2-pyrrolidone, dimethylformamide, dimethylacetamide, 1,3-dimethylimidazolidinone, hexamethylphosphoramide and piperazinones; sulfoxide/sulfone solvents such as dimethyl sulfoxide, dimethyl sulfone and sulfolane; ketone solvents such as acetone, methyl ethyl ketone, diethyl ketone and acetophenone; ether solvents such as dimethyl ether, dipropyl ether, dioxane and tetrahydrofuran; halogen solvents such as chloroform, methylene chloride, trichloroethylene, ethylene dichloride, perchloroethylene, monochloroethane, dichloroethane, tetrachloroethane, perchloroethane and chlorobenzene; alcohol/phenol solvents such as methanol, ethanol, propanol, butanol, pentanol, ethylene glycol, propylene glycol, phenol, cresol, polyethylene glycol and polypropylene glycol; and aromatic hydrocarbon solvents such as benzene, toluene and xylene. Among these organic solvents, it is especially preferable to use, for example, N-methyl-2-pyrrolidone, acetone, dimethylformamide and chloroform. Additionally, any of these organic solvents may be used alone or alternatively may be used as a mixture of two or more of the organic solvents.

An available method of organic solvent washing is, for example, a method of soaking the PPS resin (a) in the organic solvent, with adequately stirring or heating during soaking as appropriate. The washing temperature during washing of the PPS resin (a) with the organic solvent is not specifically limited, but any temperature in ordinary temperature to about 300° C. may be selected. The higher washing temperature is likely to have the higher washing efficiency, but the washing temperature in ordinary temperature to 150° C. generally achieves the sufficient effects. Another available method may perform the organic solvent washing under pressure in a pressure vessel at the temperature of not lower than the boiling point of the organic solvent. The washing time is also not specifically limited. The washing time depends on the washing conditions, but washing for 5 or more minutes generally achieves the sufficient effects in the case of batch washing. Continuous washing is also available for the organic solvent washing.

Available methods of alkali metal treatment and alkaline earth metal treatment are, for example: (i) a method of adding an alkali metal salt or an alkaline earth metal salt prior to, during or after the pre-processing step described above; (ii) a method of adding an alkali metal salt or an alkaline earth metal salt in a polymerization tank prior to, during or after the polymerization step described above; and (iii) a method of adding an alkali metal salt or an alkaline earth metal salt at an initial stage, a middle stage or a final stage of the washing step described above. Among the above methods, the simplest method is a procedure of adding an alkali metal salt or an alkaline earth metal salt after removal of the remaining oligomers and the remaining salts by washing with an organic solvent or by washing with warm water or hot water.

It is preferable to introduce an alkali metal or an alkaline earth metal into the PPS in the form of an alkali metal ion or an alkaline earth metal ion such as an acetate, a hydroxide or a carbonate. It is also preferable to remove an excess of the alkali metal salt or the alkaline earth metal salt by, for example, warm water washing. The concentration of the alkali metal ion or the alkaline earth metal ion for introduction of the alkali metal or the alkaline earth metal described above is preferably not less than 0.001 mmol and is more preferably not less than 0.01 mmol per 1 g of the PPS. The temperature is preferably not lower than 50° C., is more preferably not lower than 75° C. and is especially preferably not lower than 90° C. The upper limit temperature is not especially specified but is, in general, preferably not higher than 280° C. in terms of the operability. The liquor ratio (ratio of the weight of cleaning liquid to the dry weight of PPS) is preferably not less than 0.5, is more preferably not less than 3 and is furthermore preferably not less than 5.

It is preferable to repeat the washing with the organic solvent and the washing with warm water or about 80° C. or the washing with hot water described above several times, in terms of obtaining a reflector having the glossy appearance and the excellent light distribution performance. This removes the remaining oligomers that may cause tarnish or surface fixation. Acid treatment is preferable in terms of improving the reactivity with an alkoxysilane compound having an isocyanate group (c) as a compatibilizer.

Additionally, the PPS resin (a) may be further subject to high polymerization by thermal oxidative cross-linking treatment. The "thermal oxidative cross-linking treatment" denotes heat treatment with addition of a cross-linking agent such as a peroxide under an oxygen atmosphere after completion of polymerization.

When dry heat treatment is performed for the purpose of high polymerization by thermal oxidative cross-linking, the lower limit temperature is preferably not lower than 160° C. and is more preferably not lower than 170° C. The upper limit temperature is, on the other hand, preferably not higher than 260° C. and is more preferably not higher than 250° C. The oxygen concentration is preferably not less than 5% by volume and is more preferably not less than 8% by volume. The upper limit of the oxygen concentration is not especially specified but may be about 50% by volume. The lower limit of the processing time is preferably not less than 0.5 hours, is more preferably not less than 1 hour and is furthermore preferably not less than 2 hours. The upper limit of the processing time is, on the other hand, preferably not greater than 100 hours, is more preferably not greater than 50 hours and is furthermore preferably not greater than 25 hours. The device for heat treatment may be a general hot air drying machine, a rotary heating device or a heating device with stirring blades. It is preferable to use the rotary heating device or the heating device with stirring blades as the device for heat treatment to achieve efficient and more homogeneous treatment.

The dry heat treatment may be performed with a view to suppressing thermal oxidative cross-linking and removing volatile components. The temperature of the dry heat treatment is preferably 130 to 250° C. and is more preferably in the range of 160 to 250° C. The oxygen concentration in this case is preferably less than 5% by volume and is more preferably less than 2% by volume. The lower limit of the processing time is preferably not less than 0.5 hours and is more preferably not less than 1 hour. The upper limit of the processing time is, on the other hand, preferably not greater than 50 hours, is more preferably not greater than 20 hours and is furthermore preferably not greater than 10 hours. The device for heat treatment may be a general hot air drying machine, a rotary heating device or a heating device with stirring blades. It is preferable to use the rotary heating device or the heating device with stirring blades as the device for heat treatment to achieve efficient and more homogeneous treatment.

To achieve the high degree of surface smoothness and the high heat resistance, the PPS resin (a) may be a mixture of a PPS resin that is highly polymerized by the thermal oxidative cross-linking treatment and has excellent high-temperature rigidity and a linear PPS resin having little remaining oligomers. A mixture of a plurality of PPS resins having different melt viscosities may be used as the PPS resin (a).

(b) Mica

The PPS resin composition may contain mica having the aspect ratio of not less than 80. Mica having the aspect ratio of less than 80 has only little effect of improving the heat resistance of the PPS resin composition. This results in the need for addition of a large amount of mica exceeding 30 parts by weight relative to 100 parts by weight of the PPS resin. This undesirably lowers the flowability of the PPS resin composition and causes significant deterioration of the surface smoothness of a resulting molded product. In terms of improving the heat resistance by addition of a small amount of mica, the aspect ratio of mica is preferably not less than 80, is more preferably not less than 90 and is furthermore preferably not less than 100. The upper limit of the aspect ratio of mica is preferably not greater than 200, is more preferably not greater than 180 and is furthermore preferably not greater than 150, in terms of suppression of potential damage of mica during melt processing and easy handling.

The "aspect ratio of mica" herein is obtained by determining the volume-average particle diameter and the number-average thickness of mica and calculating "volume-average particle diameter (μm)/number-average thickness (μm)." The "volume-average particle diameter" is determined using a laser diffraction/scattering particle diameter distribution measuring apparatus (LA-300 manufactured by HORIBA, Ltd.) after weighing and dispersing 100 mg of mica in water. The "number-average thickness" is a number-average value determined by measuring the thickness of ten pieces selected at random from an image of mica observed at 2000-fold magnification with a scanning electron microscope (SEM) (JSM-6360LV manufactured by JEOL Ltd.)

In the PPS resin composition, the content of mica having the aspect ratio of not less than 80 may be 1 to 30 parts by weight relative to 100 parts by weight of the PPS resin. The content of mica of less than 1 part by weight causes insufficient improvement in heat resistance of the PPS resin composition. The content of mica of greater than 30 parts by weight, on the other hand, significantly reduces the flowability and the surface smoothness of the PPS resin composition and increases the material specific gravity. Accordingly, the content of mica of greater than 30 parts by weight deteriorates the thin-wall moldability of the PPS resin composition and also deteriorates the light distribution performance and the light-weighting effect of a reflector with a metal layer. To achieve the balance of the heat resistance and the flowability with the low specific gravity-based property, the content of mica is preferably not greater than 27 parts by weight, is more preferably not greater than 25 parts by weight and is furthermore preferably not greater than 20 parts by weight.

The volume-average particle diameter of mica used is preferably not greater than 30 μm and is more preferably not greater than 25 μm, in terms of not deteriorating the surface smoothness. It is preferable to use mica having the volume-average particle diameter of not greater than 30 μm, since this enables a molded product having excellent surface smoothness to be obtained from the PPS resin composition. The lower limit of the volume-average particle diameter is not especially specified, but is preferably not less than 5 μm and is more preferably not less than 10 μm.

In terms of providing the high heat resistance and suppressing float of fillers-induced deterioration of the surface smoothness by mixing a small amount of mica, the number-average thickness of mica is preferably not greater than 0.5 μm, is more preferably not greater than 0.35 μm and is furthermore preferably not greater than 0.25 μm. The lower limit of the number-average thickness of mica is preferably not less than 0.05 μm, is more preferably not less than 0.06 μm, and is furthermore preferably not less than 0.08 μm.

The mica having the aspect ratio of not less than 80 may be naturally-produced white mica, black mica, bronze mica or sericite or may be artificially-produced synthetic mica. The mica may include two or more different types of these micas.

The production method of mica may be, for example, water-jet grinding, wet crushing with a grindstone, or dry grinding such as dry ball mill grinding, pressure roller mill grinding, air jet mill grinding or dry grinding with an impact grinder like an atomizer.

For the purpose of enhancing the adhesiveness between mica and the PPS resin, the surface of mica may be treated with, for example, a silane coupling agent. The mica used herein may be mica subject to heat treatment for the purpose of removing impurities and hardening mica.

(c) at Least One Amorphous Resin Selected Among Polyether Imide Resins and Polyether Sulfone Resins With a view to maintaining the high degree of surface smoothness before and after heat treatment and providing the impact resistance, in addition to providing the good flowability, the high resistance, the low specific gravity-based property and the high-degree of surface smoothness, the PPS resin composition preferably contains at least one amorphous resin selected among polyether imide resins and polyether sulfone resins.

The "polyether imide" denotes a polymer containing an aliphatic, alicyclic or aromatic ether unit and a cyclic imide group as repeating units. The polyether imide is not specifically limited but may be any of such polymers having melt moldability. A structural unit other than the cyclic imide or ether linkage may be contained in the main chain of the polyether imide to such an extent that does not interfere with the advantageous effects. The structural unit other than cyclic imide or ether linkage is, for example, an aromatic ester unit, an aliphatic ester unit, an alicyclic ester unit or an oxycarbonyl unit.

A polymer shown by the following general formula is preferably used as the specific polyether imide:

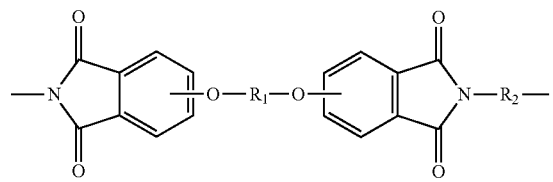

In the above formula, R1 represents a divalent aromatic residue having 6 to 30 carbon atoms; and R2 represents a divalent organic group selected among divalent aromatic residues having 6 to 30 carbon atoms, alkylene groups having 2 to 20 carbon atoms, cycloalkylene groups having 2 to 20 carbon atoms and polydiorganosiloxane groups having chain termination by alkylene groups having 2 to 8 carbon atoms. For example, those having aromatic residues shown by the following formulae are preferably used as R1 and R2 described above:

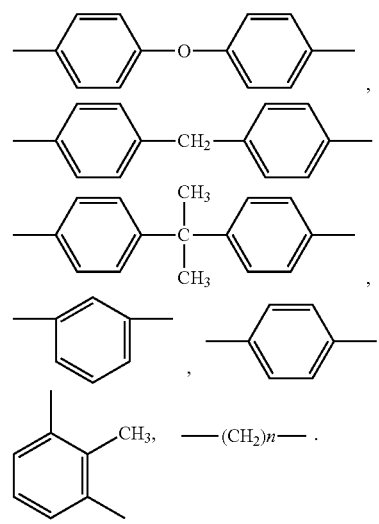

In terms of the melt moldability and the cost, condensates of 2,2-bis[4-(2,3-dicarboxyphenoxy)phenyl]propane dianhydride and m-phenylenediamine or p-phenylenediamine having structural units shown by the following formulae are preferably used as the polyether imide. This polyether imide is commercially available under the trademark of "ULTEM" from SABIC Innovative Plastics.

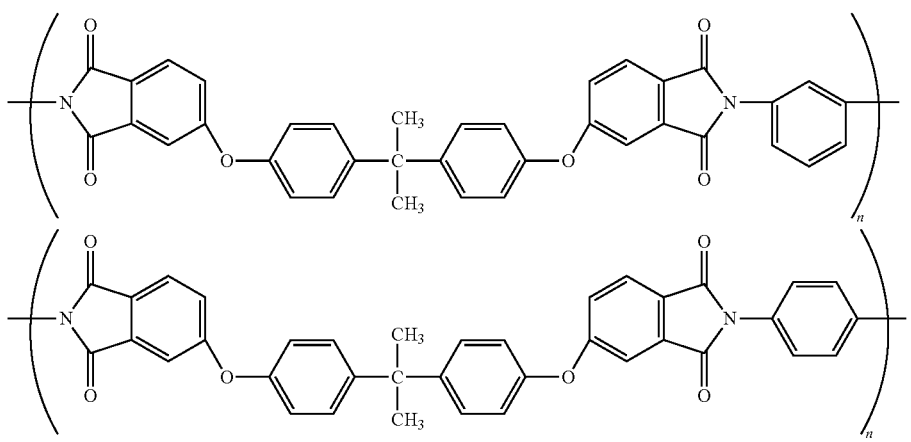

The "polyether sulfone" denotes a resin having sulfone linkage and ether linkage in the repeating backbone. The following is an example of the typical structure. The polyether sulfone is generally commercially available under the trademark of "VICTREX PES" or "SUMIKAEXCEL PES."

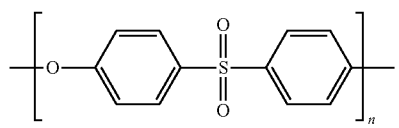

The mixing amount of at least one amorphous resin selected among polyether imide resins and polyether sulfone resins is preferably not less than 1 part by weight, more preferably not less than 5 parts by weight and furthermore preferably not less than 10 parts by weight relative to 100 parts by weight of the PPS resin (a) as the lower limit, and is preferably not greater than 100 parts by weight, more preferably not greater than 80 parts by weight and furthermore preferably not greater than 50 parts by weight relative to 100 parts by weight of the PPS resin (a) as the upper limit. When the mixing amount of the amorphous resin is less than 1 part by weight relative to 100 parts by weight of the PPS resin (a), this achieves neither improvement of the surface properties nor the sufficient effect of suppressing warpage deformation. When the mixing amount of the amorphous resin exceeds 100 parts by weight relative to 100 parts by weight of the PPS resin (a), this significantly interferes with the melt flowability and increases the material cost.

(d) Compatibilizer Having at Least One Group Selected Among Epoxy Group, Amino Group and Isocyanate Group To finely disperse the at least one amorphous resin (c) selected among polyether imide resins and polyether sulfone resins, suppress warpage deformation during high-temperature treatment and achieve the excellent surface properties and impact resistance, it is preferable to add a compound having at least one group selected among epoxy group, amino group and isocyanate group as the compatibilizer to the PPS resin composition.

Available examples of the epoxy group-containing compound include: glycidyl epoxy resins including: glycidyl ether epoxy compounds such as: glycidyl ethers of bisphenols such as bisphenol A, resorcinol, hydroquinone, pyrocatechol, bisphenol F, saligenin, 1,3,5-trihydroxybenzene, bisphenol S, trihydroxy diphenyl dimethyl methane, 4,4'-dihydroxybiphenyl, 1,5-dihydroxynaphthalene, cashew phenol, 2,2,5,5,-tetrakis(4-hydroxyphenyl)hexane; glycidyl ethers using halogenated bisphenols instead of bisphenols; and diglycidyl ether of butanediol; glycidyl ester compounds such as glycidyl phthalate; and glycidyl amine compounds such as N-glycidylaniline; linear epoxy compounds such as epoxidized polyolefins and epoxidized soybean oil; and cyclic non-glycidyl epoxy resins such as vinylcyclohexene dioxide and dicyclopentadiene dioxide.

Another example of the epoxy group-containing compound may be novolac epoxy resins. The novolac epoxy resin has two or more epoxy groups and is generally obtained by reaction of novolac phenolic resin with epichlorohydrin. The novolac phenolic resin is obtained by condensation reaction of a phenol and formaldehyde. The phenol used as the raw material is not specifically limited but may be phenol, o-cresol, m-cresol, p-cresol, bisphenol A, resorcinol, p-tert-butylphenol, bisphenol F, bisphenol S or any of these condensates.

Another example of the epoxy group-containing compound may be olefin copolymers having epoxy group. The olefin copolymer having epoxy group (epoxy group-containing olefin copolymer) is, for example, an olefin copolymer obtained by introducing an epoxy group-containing monomer component into an olefin (co)polymer. A copolymer having an epoxidized double bond of an olefin polymer having the double bond in the main chain may also be used as the epoxy group-containing compound.

Examples of the functional group-containing component that introduce the epoxy group-containing monomer component into the olefin (co)polymer include epoxy group-containing monomers such as glycidyl acrylate, glycidyl methacrylate, glycidyl ethacrylate, glycidyl itanonate and glycidyl citraconate.

The method of introducing any of these epoxy group-containing components is not specifically limited but may be a method of copolymerization with, for example, an α-olefin and a method of grafting into an olefin (co)polymer using a radical initiator.

The introducing amount of the epoxy group-containing monomer component is suitably not less than 0.001 mol % and preferably not less than 0.01 mol % relative to the entire monomers as the raw material of the epoxy group-containing olefin copolymer as the lower limit, and is suitably not greater than 40 mol % and preferably not greater than 35 mol % as the upper limit.

The epoxy group-containing olefin copolymer especially useful is olefin copolymers including α-olefin and glycidyl ester of α,β-unsaturated carboxylic acid as the copolymerization components. A preferable example of the above α-olefin is ethylene. Any of α,β-unsaturated carboxylic acids and their alkyl esters such as acrylic acid, methyl acrylate, ethyl acrylate, butyl acrylate, methacrylic acid, methyl methacrylate, ethyl methacrylate and butyl methacrylate; styrene; or acrylonitrile may be further copolymerized with any of these copolymers.

The copolymerization method of such olefin copolymer may be any of random, alternating, block and graft copolymerization methods.

Among olefin copolymers obtained by copolymerization of α-olefin and glycidyl ester of α,β-unsaturated carboxylic acid, especially preferable are olefin copolymers obtained by copolymerization of 60 to 99% by weight of α-olefin and 1 to 40% by weight of glycidyl ester of α,β-unsaturated carboxylic acid.

Examples of the above glycidyl ester of α,β-unsaturated carboxylic acid include glycidyl acrylate, glycidyl methacrylate and glycidyl ethacrylate: among them, glycidyl methacrylate is preferably used.

Concrete examples of the olefin copolymer having α-olefin and glycidyl ester of α,β-unsaturated carboxylic acid as the essential copolymerization components include: ethylene/propylene-g-glycidyl methacrylate copolymer ("g" represents graft: the same applies hereafter), ethylene/butene-1-g-glycidyl methacrylate copolymer, ethylene-glycidyl methacrylate copolymer-g-polystyrene, ethylene-glycidyl methacrylate copolymer-g-acrylonitrile-styrene copolymer, ethylene-glycidyl methacrylate copolymer-g-PMMA, ethylene/glycidyl acrylate copolymer, ethylene/glycidyl methacrylate copolymer, ethylene/methyl acrylate/glycidyl methacrylate copolymer and ethylene/methyl methacrylate/glycidyl methacrylate copolymer.

Additionally, an example of the epoxy group-containing compound may be alkoxysilanes having epoxy group. Concrete examples of the alkoxysilane having epoxy group are epoxy group-containing alkoxysilane compounds such as γ-glycidoxypropyltrimethoxysilane, γ-glycidoxypropyltriethoxysilane and β-(3,4-epoxycyclohexyl)ethyltrimethoxysilane.

An example of the amino group-containing compound may be alkoxysilanes having amino group. Concrete examples of the alkoxysilane having amino group are amino group-containing alkoxysilane compounds such as γ-(2-aminoethyl)aminopropylmethyldimethoxysilane, γ-(2-aminoethyl)aminopropyltrimethoxysilane and γ-aminopropyltrimethoxysilan.

Examples of the compound having one or more isocyanate groups include: isocyanate compounds such as 2,4-tolylenediisocyanate, 2,5-tolylenediisocyanate, diphenylmethane-4,4'-diisocyanate and polymethylene polyphenyl polyisocyanate; and isocyanate group-containing alkoxysilane compounds such as γ-isocyanate propyltriethoxysilane, γ-isocyanate propyltrimethoxysilane, γ-isocyanate propylmethyldimethoxysilane, γ-isocyanate propylmethyldiethoxysilane, γ-isocyanate propylethyldimethoxysilane, γ-isocyanate propylethyldiethoxysilane, and γ-isocyanate propyltrichlorosilane.

To achieve the effect of more finely dispersing the amorphous resin (c), at least one compound selected among compounds having one or more isocyanate groups and compounds having two or more epoxy groups is preferable; and an isocyanate group-containing alkoxysilane is more preferable.

The mixing amount of the compatibilizer having at least one group selected among epoxy group, amino group and isocyanate group is preferably not less than 1 part by weight, more preferably not less than 2 parts by weight and furthermore preferably not less than 5 parts by weight relative to 100 parts by weight of the PPS resin as the lower limit, and is preferably not greater than 30 parts by weight, more preferably not greater than 20 parts by weight and furthermore preferably not greater than 10 parts by weight as the upper limit. When the mixing amount of the compatibilizer having at least one group selected among epoxy group, amino group and isocyanate group is less than 1 part by weight, it is difficult to finely disperse at least one amorphous resin (c) selected among polyether imide resins and polyether sulfone resins at the number-average dispersed particle diameter of not less than 1 nm but less than 1000 nm. When the mixing amount of this compatibilizer exceeds 30 parts by weight, on the other hand, this undesirably causes significant interference with the melt flowability and increases the material cost.

With a view to maintaining the high degree of surface smoothness before and after heat treatment and providing the impact resistance, in addition to providing the good flowability, the high resistance, the low specific gravity-based property and the high-degree of surface smoothness, the PPS resin composition preferably has morphology (phase structure) in which the PPS resin (a) forms sea phase (continuous phase or matrix) and the amorphous resin (c) forms island phases (dispersed phases).

Additionally, the lower limit of the number-average dispersed particle diameter of the amorphous resin (c) is preferably not less than 1 nm, is more preferably not less than 10 nm and is especially preferably not less than 50 nm. The upper limit of the number-average dispersed particle diameter of the amorphous resin (c) is preferably less than 1000 nm, is more preferably less than 500 nm and is especially preferably less than 300 nm. Such fine dispersion of the amorphous resin (c) suppresses deterioration of the surface smoothness of a resulting molded product by heat treatment and maintains the high degree of surface smoothness.

When the number-average dispersed particle diameter of the amorphous resin (c) is not less than 1000 nm, this does not achieve the sufficient effect of improvement in surface smoothness and additionally causes deterioration of the surface smoothness of a molded product producing by molding the PPS resin composition and insufficient effect of improvement in dimensional stability. This may facilitate warpage deformation during heat treatment. When the number-average dispersed particle diameter of the amorphous resin (c) is not less than 1000 nm, this also does not achieve the sufficient effect of improvement in impact resistance. This may cause a disadvantage of easy breakage by a fall or by an impact. The number-average dispersed particle diameter of the amorphous resin (c) that is less than 1 nm is, on the other hand, undesirable in terms of the productivity.

The "number-average dispersed particle diameter" herein is determined by the following procedure. A rectangular mirror-surface plate of 150 mm (length)×150 mm (width)×1 mm (thickness) (gate shape: fan gate, mold mirror-surface roughness: 0.03 s) is molded at the molding temperature of melting peak temperature of the PPS resin+40° C. A thin piece of not greater than 0.1 μm is cut at −20° C. from a center area of the cross section of a central part of the rectangular mirror-surface plate in a direction orthogonal to the resin flow direction. The thin piece is observed at 20 thousand-fold magnification using a transmission electron microscope H-7100 manufactured by Hitachi, Ltd. (resolution (particle image): 0.38 nm, magnification: 500 to 600 thousand-fold). The maximum diameter and the minimum diameter are measured for each of any 100 particles with respect to the dispersed phases of the amorphous resin (c), and their mean value is specified as dispersed particle diameter of the particle. The mean value of the dispersed particle diameters is then specified as the number-average dispersed particle diameter.

Additionally, in the PPS resin composition, with respect to the dispersed phases of the amorphous resin (c), the number of dispersed phases having the dispersed particle diameter of not less than 1000 nm is preferably not greater than 1.0%, is more preferably not greater than 0.5% and is most preferably 0% of the total number of dispersed phases. When the number of dispersed phases having the dispersed particle diameter of not less than 1000 nm is in a range exceeding 1.0% due to insufficient dispersion of the amorphous resin (c) or aggregation or coalescence during the melt molding process, this causes the insufficient effect of improvement in dimensional stability of the molded product even at the number-average dispersed particle diameter of not less than 1 nm and less than 1000 nm. This results in facilitating warpage deformation especially during heat treatment and reducing the effect of improvement in heat resistance.

The number of the dispersed phases of the amorphous resin (c) having the dispersed particle diameter of not less than 1000 nm is determined by the following procedure. In the same manner as the number-average dispersed particle diameter described above, a rectangular mirror-surface plate of 150 mm (length)×150 mm (width)×1 mm (thickness) (gate shape: fan gate, mold mirror-surface roughness: 0.03 s) is molded at the molding temperature of melting peak temperature of the PPS resin+40° C. A thin piece of not greater than 0.1 μm is cut at −20° C. from a center area of the cross section of a central part of the rectangular mirror-surface plate in a direction orthogonal to the resin flow direction. The thin piece is observed at 20 thousand-fold magnification using a transmission electron microscope H-7100 manufactured by Hitachi, Ltd. (resolution (particle image): 0.38 nm, magnification: 500 to 600 thousand-fold). The maximum diameter and the minimum diameter are measured for each of any 100 particles with respect to the dispersed phases of the amorphous resin (c), and their mean value is specified as dispersed particle diameter of the particle. The percentage of the number of the dispersed phases having the dispersed particle diameter of not less than 1000 nm to the total number of dispersed phases or more specifically 100 dispersed phases of the amorphous resin (c) is then determined.

Moreover, it is preferable that the PPS resin composition has the stable morphology (phase structure). More specifically, it is preferable that the PPS resin (a) forms sea phase (continuous phase or matrix) and the amorphous resin 8c) forms island phases (dispersed phases) even in a re-molded piece, which is obtained by breaking a molded piece produced by injection molding the PPS resin composition and subsequently re-molding the broken pieces by injection molding. Furthermore, the lower limit of the number-average dispersed particle diameter of the amorphous resin (c) is preferably not less than 1 nm, is more preferably not less than 10 nm and is especially preferably not less than 50 nm. The upper limit of the number-average dispersed particle diameter of the amorphous resin (c) is, on the other hand, preferably less than 1000 nm, is more preferably less than 500 nm and is especially preferably less than 300 nm.

Additionally, with respect to the dispersed phases of the amorphous resin (c), the number of dispersed phases having the dispersed particle diameter of not less than 1000 nm is preferably not greater than 1.0%, is more preferably not greater than 0.5% and is most preferably 0% of the total number of dispersed phases.

With respect to the phase structure of the PPS resin composition, the dispersed particle diameter of the amorphous resin (c) may be controlled uniformly by dissolution of the PPS resin (a) and the amorphous resin (c) in, for example, a commonly-soluble solvent for molecular compatibility and subsequent spinodal decomposition. In terms of the productivity, on the other hand, the phase structure may be controlled such that the dispersed particle diameter of the amorphous resin (c) has a specific distribution, by melt kneading without spinodal decomposition.

(e) Other Inorganic Fillers

The PPS resin composition may additionally include an inorganic filler in a range that does not damage the advantageous effects. Specific examples of such inorganic filler include: fibrous fillers such as glass fibers, carbon fibers, carbon nanotubes, carbon nanohorns, potassium titanate whiskers, zinc oxide whiskers, calcium carbonate whiskers, wollastonite whiskers, aluminum borate whiskers, aramid fibers, alumina fibers, silicon carbide fibers, ceramic fibers, asbestos fibers, gypsum fibers and metal fibers: and non-fibrous fibers including: fullerene; silicates such as talc, wollastonite, zeolite, sericite, kaolin, clay, pyrophyllite, silica, bentonite, asbestos and alumina silicate; metal compounds such as silicon oxide, magnesium oxide, alumina, zirconium oxide, titanium oxide and iron oxide; carbonates such as calcium carbonate, magnesium carbonate and dolomite; sulfates such as calcium sulfate and barium sulfate; hydroxides such as calcium hydroxide, magnesium hydroxide and aluminum hydroxide; glass beads, glass flakes, glass powders, ceramic beads, boron nitride, silicon carbide, carbon black, silica and graphite. Among them, silica, calcium carbonate and talc are preferable. Calcium carbonate and talc are specially preferable, in terms of achieving the good balance between the surface smoothness and the mechanical properties of the resin molded product. Any of these inorganic fillers may be hollow, and two or more of these inorganic fillers may be used in combination. Any of these inorganic fillers may be used after pre-treatment with a coupling agent such as an isocyanate compound, an organosilane compound, an organotitanate compound, an organoboron compound or an epoxy compound.

The mixing amount of this inorganic filler is preferably not less than 1 part by weight, more preferably not less than 2 parts by weight and furthermore preferably not less than 5 parts by weight relative to 100 parts by weight of the PPS resin (a) as the lower limit, and is preferably not greater than 50 parts by weight, more preferably not greater than 30 parts by weight and furthermore preferably not greater than 20 parts by weight as the upper limit.

(f) Other Additives

Additionally, the PPS resin composition may further include a resin other than the amorphous resin (c) in a range that does not damage the advantageous effects. Specific examples are olefin polymers and copolymers without containing epoxy group such as polyamide resin, polybutylene terephthalate resin, polyethylene terephthalate resin, modified polyphenylene ether resin, polysulfone resin, polyarylsulfone resin, polyketone resin, polyarylate resin, liquid crystal polymer, polyether ketone resin, polythioether ketone resin, polyether ether ketone resin, polyimide resin, polyamide imide resin, polytetrafluoroethylene resin, and ethylene-1-butene copolymer.

The following compounds may be added for the purpose of modification. The PPS resin composition may include any of: plasticizers such as polyalkylene oxide oligomer-based compounds, thioether-based compounds, ester-based compounds and organophosphorus-based compounds; crystal nucleating agents such as organophosphorus compounds and polyether ether ketone; montanic acid waxes; metal soaps such as lithium stearate and aluminum stearate; mold release agents such as ethylene diamine-stearic acid-sebacic acid polycondensates and silicone-based compounds; coloring inhibitors such as hypophosphites; phenolic antioxidants such as (3,9-bis[2-(3-(3-t-butyl-4-hydroxy-5-methylphenyl) propionyloxy)-1,1-dimethylethyl]-2,4,8,10-tetraoxaspiro[5,5]undecane); phosphorus antioxidants such as (bis(2,4-dicumylphenyl)pentaerythritol diphosphite); and conventional additives including water, lubricants, ultraviolet absorbers, coloring agents and foaming agents. Any of the above compounds exceeding 20% by weight of the entire composition damages the intrinsic properties of the PPS resin (a) and is thus undesirable. The added amount is accordingly not greater than 10% by weight and is more preferably not greater than 1% by weight.

Production Method of Resin Composition

A typical production method of the PPS resin composition may be a method that feeds the raw materials to a generally known melt kneading machine such as a single-screw extruder, a twin-screw extruder, a Banbury mixer, a kneader, or a mixing roll and melt-kneads the fed raw materials at the processing temperature of the melting peak temperature of the PPS resin+5 to 100° C. It is preferable to use a twin-screw extruder for production and apply a relatively high shear force, in terms of fine dispersion of the mica (b) and the amorphous resin (c). A specific procedure may use a twin-screw extruder having L/D (L: screw length, D: screw diameter) of not less than 20 and preferably of not less than 30 and having three or more kneading sections or more preferably five or more kneading sections per screw and knead the mixture at the screw rotation speed of 200 to 1000 rotations/minute or preferably 300 to 1000 rotations/minute and at the resin temperature during mixing controlled to the melting peak temperature of the PPS resin+10 to 70° C. The upper limit of L/D is not especially specified but is preferably not greater than 60 in the light of the economic efficiency. The upper limit of the number of kneading sections is not especially specified but is preferably not greater than ten in the light of the productivity.

A method of melt kneading with stretched flowstretched flow is also preferable as the production method of the PPS resin composition. The "stretched flowstretched flow" herein means a fluid process where molten resin is stretched in two flows flowing in the opposite directions. The generally employed shear flow, on the other hand, means a fluid process where molten resin is subject to deformation in two flows flowing in the same direction but at different speeds.

Melt kneading using an extruder is preferably employed as the method of melt kneading with stretched flowstretched flow. Available examples of the extruder include a single-screw extruder, a twin-screw extruder and a multi-screw extruder of three or more screws. Among them, the single-screw extruder and the twin-screw extruder are preferably used, and the twin-screw extruder is used especially preferably. The screws of the twin-screw extruder are not specifically limited but may be fully intermeshing type, partially intermeshing type or non-intermeshing type screws. In the light of the kneading property and the reactivity, the fully intermeshing type is preferable. The rotational directions of the screws may be the same direction or may be different directions, but rotation in the same direction is preferable in the light of the kneading property and the reactivity.

In the case of melt kneading using the extruder, it is preferable that flow-effect pressure drop before and after a zone of melt kneading with stretched flowstretched flow (stretched flowstretched flow zone) is 10 to 1000 kg/cm$^2$. The "flow-effect pressure drop before and after the zone of melt kneading with stretched flow (stretched flow zone)" is determined by subtracting a pressure difference ($\Delta P_0$) in the stretched flow zone from a pressure difference ($\Delta P$) before the stretched flow zone. When the flow-effect pressure drop before and after the stretched flow zone is less than 10 kg/cm$^2$, this undesirably reduces the rate of formation of the stretched flow in the stretched flow zone and causes a non-uniform pressure distribution. When the flow-effect pressure drop before and after the stretched flow zone is greater than 1000 kg/cm$^2$, on the other hand, this undesirably causes an excessive increase in back pressure in the extruder and leads to difficulty in stable production. The flow-effect pressure drop before and after the zone of melt kneading with stretched flow (stretched flow zone) is preferably not less than 30 kg/cm$^2$, more preferably not less than 50 kg/cm$^2$, and most preferably not less than 100 kg/cm$^2$ as the lower limit, and is preferably not greater than 600 kg/cm$^2$ and more preferably not greater than 500 kg/cm$^2$ as the upper limit.

In the case of melt kneading using the extruder, to provide a suitable stretched flow, the ratio of the total length of the zones of melt kneading with stretched flow (stretched flow zones) to the entire length of the screws of the extruder is preferably not less than 5%, more preferably not less than 10% and furthermore preferably not less than 15% as the lower limit and is preferably not greater than 60%, more preferably not greater than 55% and furthermore preferably not greater than 50% as the upper limit.

In the case of melt kneading using the extruder, when the length of one zone of melt kneading with stretched flow (stretched flow zone) in the screw of the extruder is Lk and the screw diameter is D, in the light of the kneading property and the reactivity, the lower limit of Lk/D is preferably not less than 0.2, is more preferably not less than 0.3 and is furthermore preferably not less than 0.5, while the upper limit of Lk/D is preferably not greater than 10, is more preferably not greater than 9 and is furthermore preferably not greater than 8. It is preferable that the zones of melt kneading with stretched flow (stretched flow zones) of the twin-screw extruder are not localized at any specific location in the screw but are arranged over the entire area. In the light of the kneading property and the reactivity, it is especially preferable to arrange the zones of melt kneading with stretched flow (stretched flow zones) at three or more different locations in the screw of the extruder.

In the case of melt kneading using the extruder, according to one preferable example, the zone of melt kneading with stretched flow (stretched flow zone) may be defined by a twist kneading disk. A helix angle θ which is an angle between the top of the disk front end side and the top of the rear face side of the kneading disk may be in the range of 0°<θ<90° in the half rotational direction of the screw. According to another preferable example, the zone of melt kneading with stretched flow (stretched flow zone) may be defined by a flight screw. A flight section of the flight screw may have a resin passage of the reduced cross sectional area from the screw front end side toward the rear end side. A resin passage of the gradually reduced cross sectional area which the molten resin passes through may be formed in the extruder.

In the case of melt kneading using the extruder, the extrusion capacity of the thermoplastic resin composition relative to 1 rpm of the screw is preferably not less than 0.01 kg/h. The "extrusion capacity" means the extrusion rate of the thermoplastic resin composition extruded from the extruder and is expressed by the weight (kg) extruder per hour. When the extrusion capacity of the thermoplastic resin composition relative to 1 rpm of the screw is less than 0.01 kg/h, this insufficient extrusion capacity relative to the rotation speed excessively increases the retention time in the extruder, which may lead to thermal degradation, and reduces the resin filling ratio in the extruder, which may result in insufficient kneading. The rotation speed of the screw is not specifically limited in the above range, but is generally not less than 10 rpm, is preferably not less than 50 rpm and is furthermore preferably not less than 80 rpm. The extrusion capacity is not specifically limited in the above range, but is generally not less than 0.1 kg/h, is preferably not less than 0.15 kg/h and is furthermore preferably not less than 0.2 kg/h.

In the case of melt kneading using the extruder, the retention time of the thermoplastic resin composition in the extruder is preferably 0.1 to 20 minutes. The "retention time" means a time period between the time when a coloring agent or the like is fed with the raw materials from a screw base position for supply of raw materials and the time when the thermoplastic resin composition is extruded from the outlet of the extruder and the extruded composition has the maximum degree of coloring by the coloring agent. When the retention time is less than 0.1 minute, this provides only a short reaction time in the extruder and does not sufficiently accelerate the reaction, thus not sufficiently improving the properties (e.g., dimensional stability and mechanical properties) of the thermoplastic resin composition. When the retention time is longer than 20 minutes, on the other hand, this long retention time is likely to cause thermal degradation of the resin. The retention time is preferably not shorter than 0.3 minutes and more preferably not shorter than 0.5 minutes as the lower limit and is preferably not longer than 15 minutes and more preferably not longer than 5 minutes as the upper limit.

Available procedures with respect to the mixing order of the raw materials include: a procedure of mixing all the raw materials and melt kneading the mixture by the above method; a procedure of mixing part of the raw materials, melt kneading the partial mixture by the above method, adding the remaining raw materials and further melt kneading the resulting mixture; and a procedure of mixing part of the raw materials and subsequently adding the remaining raw materials using a side feeder during melt kneading of the partial mixture with the twin-screw extruder. To obtain the PPS resin composition having the significantly improved dimensional stability and surface properties in addition to the heat resistance, the flowability and the lightweight property, a preferable method pre-melt kneads a resin composition consisting of the PPS resin (a), the amorphous resin (c) and the compatibilizer (d) and subsequently further melt kneads the resin composition with the mica (b). Simultaneous kneading of the PPS resin (a), the mica (b), the amorphous resin (c) and the compatibilizer (d) undesirably coarsens dispersed phases of the amorphous resin (c).

To disperse the amorphous resin (c) at the number-average dispersed particle diameter of not less than 1 nm and less than 1000 nm and control the number of dispersed phases having the dispersed particle diameter of not less than 1000 nm to be not greater than 1.0% of the total number of dispersed phases, a further preferable method pre-melt kneads a resin composition consisting of the PPS resin (a), the amorphous resin (c) and the compatibilizer (d) to prepare the resin composition containing the high concentration of the amorphous resin and subsequently further melt kneads the resin composition with the PPS resin (a) and the mica (b) for dilution of the amorphous resin. A simple procedure of simultaneously kneading the PPS resin (a), the mica (b), the amorphous resin (c) and the compatibilizer (d) and subsequently repeating the kneading process again may cause the number-average dispersed particle diameter of the amorphous resin (c) to be not less than 1 nm and less than 1000 nm in some cases. The melt kneading process of this PPS resin composition, however, induces aggregation and coalescence of the amorphous resin (c) and causes the number of the dispersed phases of the amorphous resin (c) having the dispersed particle diameter of not less than 1000 nm to exceed 1.0%. This undesirably provides the insufficient effect of suppressing warpage deformation.

In the process of pre-melt kneading the resin composition consisting of the PPS resin (a), the amorphous resin (c) and the compatibilizer (d), on the assumption that the sum of (a) and (c) is 100% by weight, the mixing ratio of the PPS resin (a) to the amorphous resin (c) is (a)/(c)=90 to 1% by weight/10 to 99% by weight, is preferably (a)/(c)=85 to 10% by weight/15 to 90% by weight, is more preferably (a)/(c)= 80 to 30% by weight/20 to 70% by weight and is furthermore preferably in the range of (a)/(c)=70 to 50% by weight/30 to 50% by weight. The amorphous resin (c) of less than 10% by weight is undesirable, since this does not assure sufficient progress of the reaction of the PPS resin (a), the amorphous resin (c) and the compatibilizer (d) and is likely to cause the number of dispersed phases having the dispersed particle diameter of not less than 1000 nm to exceed 1.0% of the total number of dispersed phases with regard to the dispersed phases of the amorphous resin (c).

In the process of pre-melt kneading the resin composition consisting of the PPS resin (a), the amorphous resin (c) and the compatibilizer (d), the melt viscosity of the PPS resin (a) is not specifically limited but is, in terms of easy application of shear force during kneading, preferably not less than 150 Pa·s and more preferably not less than 200 Pa·s. The "melt viscosity" herein is a measured value using Capilograph manufactured by Toyo Seiki Seisaku-sho, Ltd. under the conditions of 300° C. and shear rate of 1000/s.

In the process of pre-melt kneading the resin composition consisting of the PPS resin (a), the amorphous resin (c) and the compatibilizer (d), the mixing amount of the compatibilizer (d) is not less than 0.05 parts by weight, more preferably not less than 0.1 parts by weight and furthermore preferably not less than 0.2 parts by weight relative to the total 100 parts by weight of the PPS resin (a) and the amorphous resin (c) as the lower limit and is not greater than 10 parts by weight, more preferably not greater than 5 parts by weight and furthermore preferably not greater than 3 parts by weight as the upper limit. Controlling the mixing amount of the compatibilizer (d) to be not less than the above desired amount enables the amorphous resin (c) to be finely dispersed at the number-average dispersed particle diameter of not less than 1 nm and less than 1000 nm. Additionally, controlling the mixing amount of the compatibilizer (d) to be not greater than the above desired amount reduces the gas emission and desirably provides a composition having the excellent melt flowability.

The melt viscosity of the PPS resin (a) to be further melt kneaded with the pre-melt kneaded resin composition is arbitrarily selected. The flowability of the finally produced PPS resin composition may be controlled by selection of the melt viscosity. In terms of improving the thin-wall moldability by good flowability, the melt viscosity of the PPS resin (a) to be further melt kneaded is preferably not greater than 150 Pa·s and is more preferably not greater than 100 Pa·s. The "melt viscosity" herein is a measured value using Capilograph manufactured by Toyo Seiki Seisaku-sho, Ltd. under the conditions of 300° C. and shear rate of 1000/s.

In the process of pre-melt kneading the resin composition consisting of the PPS resin (a), the amorphous resin (c) and the compatibilizer (d) and subsequently further melt kneading the resin composition with the PPS resin (a) and the mica (b), one available procedure may pre-melt knead and pelletize the resin composition consisting of the PPS resin (a), the amorphous resin (c) and the compatibilizer (d) and subsequently further melt knead the pellets after addition of the PPS resin (a) and the mica (b). Another available procedure may feed the PPS resin (a) and the mica (b) from the middle of the extruder using a side feeder during pre-melt kneading of the resin composition consisting of the PPS resin (a), the amorphous resin (c) and the compatibilizer (d) and further melt knead the resulting resin composition.

A molded product produced by molding the PPS resin composition has good flowability, high heat resistance and high degree of surface smoothness and maintains the good surface smoothness and before and after heat treatment. This allows for direct metal evaporation with no surface preparation such as undercoating and provides a glossy reflector without clouding caused by gas or float of fillers. This is also likely to have the light-weighting effect by wall thinning of the thickness of the molded product.

To maximize the good flowability and the low specific gravity-based light-weighting effect of the PPS resin composition, the bar flow length as the index of flowability needs to be not less than 70 mm, is preferably not less than 80 mm and is more preferably not less than 90 mm. The material specific gravity, on the other hand, needs to be not greater than 1.50 is preferably not greater than 1.47 and is more preferably not greater than 1.45. The PPS resin composition having the bar flow length of not less than 70 mm and the material specific gravity of not greater than 1.50 is more preferable, since this is likely to have the light-weighting effect by replacement of a thermosetting resin or a metal having the material specific gravity of not less than 2.0 with the PPS resin composition.

The "bar flow length" is determined by the following procedure. A molded piece of 150 mm (length)×12.6 mm (width)×0.5 mm (thickness (gate position: width side of molded piece, gate shape: side gate) is injection molded continually ten times under the conditions of the resin temperature of 320° C., the mold temperature of 150° C., the injection rate set to 99% and the injection pressure set to 45% (observed value: injection pressure of 98 MPa) using an injection molding machine Promat 40/20 manufactured by Sumitomo Heavy Industries, Ltd. The length of each molded piece in the longitudinal direction from the gate position to the filling end is measured, and its mean value is specified as the bar flow length.

The "material specific gravity" is determined by the following procedure. A molded product of 70 mm (length)× 70 mm (width)×1.0 mm (thickness) produced from the PPS resin composition is cut into a piece of 30 mm (length)×10 mm (width). The specific gravity of the piece is then measured as the material specific gravity by the method of water displacement using a Mirage electronic densimeter ED-120T manufactured by Ektron Tek Co., Ltd.

The PPS resin composition has excellent thin-wall heat resistance and accordingly has a heat sag amount of not greater than 18 mm, preferably not greater than 15 mm and more preferably not greater than 12 mm as the index of the thin-wall heat resistance. When the PPS resin composition has the heat sag amount of not greater than 18 mm, the PPS resin composition is enabled to have the practical heat resistance which allows for light-weighting and downsizing product design by wall-thinning of automobile components and electric and electronic components having the product thickness of 2 to 3 mm. The PPS resin composition uses the high aspect ratio-mica having the aspect ratio of not less than 80 and thus enables the heat sag amount to be significantly reduced by addition of even a small amount of mica. This reason may be attributed to that increasing the aspect ratio of mica, i.e., thinning the mica enhances the reinforcing effect and increases the number of mica particles by a fixed amount of addition, thus maximizing the effect of suppressing thermal deformation.

The "heat sag amount" is determined by the following procedure. While being held at a length of 30 mm from one end and fixed horizontally in a cantilevered state, a heat sag test piece of 130 mm (length)×12.7 mm (width)×0.7 mm (thickness) is treated in a hot air oven at 180° C. for 60 minutes. The sag from the horizontal state by the dead weight at the opposite end of the test piece that is opposite to the cantilevered end is then measured as the heat sag amount with a height gauge.

To obtain a reflector having excellent light distribution property and glossy appearance using the PPS resin composition, there is a need to suppress the float of fillers on the surface of the molding product and the waviness of the molten resin in the flow direction to the maximum extent possible. It has been found that the float of fillers is clearly related to a center line waviness Ra on the surface of the molded product. It has also been found that the waviness of the molten resin in the flow direction is, on the other hand, clearly related to an arithmetic mean waviness Wa on the surface of the molded product and a non-Newtonian index N.

The "center line waviness Ra" is a numerical value measured in conformity with JIS B0601 using a plate of 70 mm (length)×70 mm (width)×1.0 mm (thickness) formed by a film gate. The center line waviness Ra needs to be not greater than 1.2 µm, is preferably not greater than 0.5 µm and is more preferably not greater than 0.1 µm. Especially the PPS resin composition having the center line waviness Ra of not greater than 0.1 µm enables a significantly glossy reflector to be obtained without clouding caused by float of fillers even in the case of direct metal evaporation on the surface of a molded product.

The "arithmetic mean waviness Wa" is a numerical value measured in conformity with JIS B0601 using a plate of 70 mm (length)×70 mm (width)×1.0 mm (thickness) formed by a film gate. The center line waviness Ra needs to be not greater than 1.2 µm, is preferably not greater than 0.5 µm and is more preferably not greater than 0.1 µm. The arithmetic mean waviness Wa needs to be not greater than 6.5 µm, is preferably not greater than 3.0 µm and is more preferably not greater than 1.0 µm. Especially the PPS resin composition having the arithmetic mean waviness Wa of not greater than 1.0 µm significantly reduces the flow mark or the sink mark, which is likely to be formed in a thin-wall molded product by the waviness of the molten resin in the flow direction, and remarkably improves the light distribution performance (image clarity) of the reflector subject to metal layer deposition. The "flow mark" denotes a flow pattern of the resin formed on the surface of the molded product. The "sink mark" denotes a recess formed on the surface of the molded product by the material shrinkage in the course of solidification.

We found that the non-Newtonian index N of the PPS resin (a) is related to the waviness of the molten resin in the flow direction on the surface of the molded product and that the high degree of surface smoothness is achieved by controlling the non-Newtonian index of the PPS resin (a), in addition to suppressing the float of fillers. The lower limit of the non-Newtonian index is preferably not less than 1.25, is more preferably not less than 1.30 and is furthermore preferably not less than 1.32. The upper limit of the non-Newtonian index is, on the other hand, preferably not greater than 1.40, is more preferably not greater than 1.38 and is furthermore preferably not greater than 1.36. The PPS resin (a) controlled to have the non-Newtonian index N of not greater than 1.40 preferably reduces the flow mark by the waviness of the molten resin in the flow direction and maintains the good light distribution performance of the reflector. Decreasing the non-Newtonian index N below 1.25 is, however, undesirable, since this is not likely to enhance the effect of suppressing the waviness in the flow direction but is likely to cause burr. The "burr" means an excess of thin resin film formed by flowing and solidifying the molding material in the molten state into the clearance of a mold. An increase in non-Newtonian index of the PPS resin (a) increases the waviness of the molten resin in the flow direction on the surface of the molded product. This reason may be attributed to that the non-Newtonian index is related to the shear rate dependency of the molten resin and that an increase in shear rate dependency of the molten resin is likely to cause the waviness (periodical irregularities) in the flow direction when the molten resin passes through the gate in the mold.

The "non-Newtonian index" is determined by the following procedure. The PPS resin (a) is melt kneaded, is pelletized with a strand cutter, is dried under atmospheric pressure at 120° C. for 8 hours, and is further pre-dried at 130° C. for 3 hours. The shear rate and the shear stress are measured using Capilograph under the conditions of 320° C. and L/D=10, where "L" represents the length of orifice and "D" represents the diameter of orifice, and the non-Newtonian index is calculated by the following equation:

Equation: $SR = K \cdot SS \cdot N$ (where N represents the non-Newtonian index, SR represents shear rate (1/second), SS represents shear stress (dyne/cm$^2$) and K represents a constant).

For development to the application of automobile lighting components by direct metal evaporation on a mirror-surface molded product (mold mirror-surface roughness: 0.03 s) obtained from the PPS resin composition, the regular reflectance needs to be not less than 85% and the diffuse reflectance needs to be not greater than 1.5%; preferably the regular reflectance is not less than 87% and the diffuse reflectance is not greater than 1.3%; and more preferably the regular reflectance is not less than 89% and the diffuse reflectance is not greater than 1.0%. When the reflector obtained from the PPS resin composition by direct metal evaporation has the regular reflectance of less than 85% and the diffuse reflectance of greater than 1.5%, the obtained reflector has a significant degree of clouding by gas or float of fillers observed on the metal evaporated surface, a practically unsatisfactory level of the light distribution performance and the dull appearance.

The "regular reflectance" (total reflectivity−diffuse reflectance) and the "diffuse reflectance" are determined by the following procedure. A mirror surface part of a mirror surface plate of 150 mm (length)×150 mm (width)×1.0 mm (thickness) (gate shape: fan gate, mold mirror-surface roughness: 0.03 s) is degreased with isopropyl alcohol and is then subject to evaporation of metal aluminum (thickness of evaporated film is about 0.1 μm) using a vacuum deposition apparatus manufactured by Hitachi, Ltd. The total reflectivity, the diffuse reflectance and the regular reflectance (total reflectivity−diffuse reflectance) are measured with respect to three different locations, i.e., gate section, center section and filling end section using an ultraviolet-visible spectrophotometer (SoldSpec-3700 DUV) manufactured by SHIMADZU CORPORATION, and their mean values are calculated.

Formation of Metal Layer

A reflector with a metal layer formed on a molded product of the PPS resin composition is a reflector with a metal layer formed on a molded product produced by molding the PPS resin composition described above by a known technique, for example, injection molding, extrusion molding, compression molding, blow molding or injection compression molding. A preferable reflector is a reflector with a metal layer formed on a molded product produced by injection molding in a temperature range of 280° C. to 340° C.

Available methods of formation of a metal layer include methods of film formation of a metal such as aluminum, copper, nickel, cobalt, nickel-cobalt alloy or silver by a wet process like electroplating or electroless plating or by a dry process like vacuum deposition, sputtering or ion plating. Among the methods of formation of a metal layer, a procedure of performing vacuum deposition after degreasing the surface of a molded product with isopropyl alcohol or the like is preferable in terms of the cost and the workability.

The molded product of the PPS resin composition used for the reflector with a metal layer has excellent surface smoothness and accordingly allows for direct metal evaporation. The molded product of the PPS resin composition may, however, be subject to primer (undercoating) process or surface roughening process. The primer may be, for example, epoxy-based, acrylic-based, urethane-based, acrylic urethane-based or melamine-based. The surface roughening process may be, for example, UV process, corona discharge process or plasma process.

The meal film may be coated with a transparent protective film of good heat resistance as appropriate. Specific examples of the protective film include painting-type top coat, plasma polymerized film and evaporated film.

The reflector with a metal layer formed on the molded product of the PPS resin composition has excellent heat resistance as well as excellent flowability, impact resistance and surface properties. The reflector is accordingly applicable to downlight covers and reflectors for household lighting apparatuses, reflectors and lamp covers for projectors, reflectors and lamp components used in LED packages, backlight-collecting reflectors for liquid crystal TVs and liquid crystal display panels, reflectors used for indicating lamps such as guide lights and advertising lamps, light reflectors for headlights, fog lights and rear lights of automobiles and motorcycles, reflectors for room lamps, lamp housings, lamp units, lighting reflectors for medical equipment, reflectors for physical and chemical appliances such as UV spot irradiators, reflectors for photographing lighting equipment (electronic flash) and reflectors for illumination-type push switches and photoelectric switches.

EXAMPLES

The following more specifically describes our compositions, methods and reflectors with reference to Examples, but this disclosure is not limited to these Examples.

In Examples described below, the material properties were evaluated by the following methods.

Injection Molding of Heat Sag Test Piece

A heat sag test piece of 130 mm (length)×12.7 mm (width)×0.7 mm (thickness) was molded under the molding conditions of the resin temperature of 320° C. and the mold temperature of 150° C. using an injection molding machine Promat 40/20 manufactured by Sumitomo Heavy Industries, Ltd.

Injection Molding of Mirror-Surface Plate for Evaluation of Reflector

A mirror-surface plate of 150 mm (length)×150 mm (width)×1.0 mm (thickness) (gate shape: fan gate, mold mirror surface roughness: 0.03 s) was molded under the molding conditions of the resin temperature of 320° C. and the mold temperature of 150° C. using an injection molding machine SE220HSZ manufactured by Sumitomo Heavy Industries, Ltd.

Injection Molding of Plate for Evaluation of Surface Smoothness

A plate of 70 mm (length)×70 mm (width)×1.0 mm (thickness) (gate shape: film gate) was molded under the molding conditions of the resin temperature of 320° C. and the mold temperature of 150° C. using an injection molding machine SE75DUZ manufactured by Sumitomo Heavy Industries, Ltd.

Heat Sag Amount

While being held at a length of 30 mm from one end and fixed horizontally in a cantilevered state, the injection-molded heat sag test piece described above was treated in a hot air oven at 180° C. for 60 minutes. The sag from the horizontal state by the dead weight at the opposite end of the test piece that was opposite to the cantilevered end was then measured as a heat sag amount with a height gauge. This value was a mean value of two samples. The smaller heat sag amount indicates the higher thin-wall heat resistance.

Bar Flow Length

A molded piece of 150 mm (length)×12.6 mm (width)×0.5 mm (thickness)(gate position: width side of molded piece, gate shape: side gate) was injection molded continually ten times under the conditions of the resin temperature of 320° C., the mold temperature of 150° C., the injection rate set to 99% and the injection pressure set to 45% (observed value: injection pressure of 98 MPa) using an injection molding machine Promat 40/20 manufactured by Sumitomo Heavy Industries, Ltd. The length of each molded piece in the longitudinal direction from the gate position to the filling end was measured with a ruler, and its mean value was specified as the bar flow length. The greater value indicates the better thin-wall flowability.

Material Specific Gravity

The injection-molded plate for evaluation of surface smoothness (gate shape: film gate) described above was cut into a piece of 30 mm (length)×10 mm (width). The specific gravity of the piece was then measured as the material specific gravity by the method of water displacement using a Mirage electronic densimeter ED-120T manufactured by Ektron Tek Co., Ltd. This value was a mean value of two samples. The smaller value is likely to have the more light-weighting effect.

Measurement Method of Melt Viscosity

The powder of the polyphenylene sulfide resin (a) was pre-dried under atmospheric pressure at 120° C. for 8 hours. The melt viscosity of the polyphenylene sulfide resin (a) was then measured using Capilograph under the conditions of the measurement temperature of 300° C., the shear rate of 1000/s and the orifice length L/orifice diameter D=10. The smaller value indicates the PPS resin of the better flowability.

Non-Newtonian Index

The polyphenylene sulfide resin (a) was melt kneaded, was pelletized with a strand cutter, was dried under atmospheric pressure at 120° C. for 8 hours, and was further pre-dried at 130° C. for 3 hours. The shear rate and the shear stress were measured using Capilograph under the conditions of 320° C. and L/D=10, and the non-Newtonian index N was calculated by the following equation. This value in the range of $1.25 \leq N \leq 1.40$ is likely to provide the material having the excellent surface smoothness.

Equation: $SR = K \cdot SS \cdot N$ (where N represents the non-Newtonian index, SR represents shear rate (1/second), SS represents shear stress (dyne/cm$^2$) and K represents a constant).

Surface Smoothness

With regard to the injection-molded plate for evaluation of surface smoothness (gate shape: film gate) described above, a measurement terminal was scanned by 2 cm in the resin flow direction (gate section to filling end section) using a surface roughness tester manufactured by Mitsutoyo Corporation, and the center line waviness Ra and the arithmetic mean waviness Wa were measured in conformity with JIS B0601, where a mean value of n=3 was employed. The smaller values indicate the better surface smoothness.

Direct Metal Evaporation/Evaluation of Reflector Before Heat Treatment

A mirror surface part of the injection-molded mirror-surface plate for evaluation of reflector described above was degreased with isopropyl alcohol and was then subject to evaporation of metal aluminum using a vacuum deposition apparatus manufactured by Hitachi, Ltd. The thickness of the metal layer was about 0.1 μm. The total reflectivity, the diffuse reflectance and the regular reflectance (total reflectivity–diffuse reflectance) were measured with respect to three different locations, i.e., gate section, center section and filling end section of the aluminum-evaporated mirror-surface plate using an ultraviolet-visible spectrophotometer (SoldSpec-3700 DUV) manufactured by SHIMADZU CORPORATION, and a mean value of n=3 was employed. The greater value indicates the more excellent initial reflectance properties.

Direct Metal Evaporation/Evaluation of Reflector after Heat Treatment

The aluminum-evaporated mirror-surface plate described above was placed in a hot air oven and was subject to heat treatment of 180° C.×240 hr. The total reflectivity, the diffuse reflectance and the regular reflectance (total reflectivity–diffuse reflectance) were measured with respect to three different locations, i.e., gate section, center section and filling end section of this mirror-surface plate using an ultraviolet-visible spectrophotometer (SoldSpec-3700 DUV) manufactured by SHIMADZU CORPORATION, and a mean value of n=3 was employed. The greater value of regular reflectance indicates the more excellent reflectance properties under high-temperature environment.

Direct Metal Evaporation/Molded Product Appearance after Heat Treatment

The molded product appearance of the aluminum-evaporated mirror-surface plate described above was visually observed after heat treatment of 180° C.×240 hr and was evaluated as follows. The number of samples was three.
- open circle: glossy metal evaporated surface with little clouding by gas or float of fillers;
- triangle: less glossy metal evaporated surface with little clouding by gas or float of fillers; and
- cross mark: dull metal evaporated surface with a relatively high degree of clouding by gas or float of fillers.

Falling Ball Impact Test

The aluminum-evaporated mirror-surface plate of 1 mm in thickness described above was placed on a cradle of 70 mm (length)×70 mm (width)×50 mm (height). A rigid ball of 150 g was fallen from the height of 100 cm to the center of the above molded product, and the molded product was evaluated with respect to the occurrence or non-occurrence of breakage or cracking. The number of samples was three.
- open circle: not broken;
- triangle: only cracked; and
- cross mark: cracked and broken.

Evaluation of High-Temperature Rigidity

The injection-molded heat sag test piece described above was cut into a piece of 40 mm (length)×8 mm (width)×0.7 mm (thickness), and the storage modulus E' was measured under the following measurement conditions using a dynamic viscoelasticity measurement apparatus (DMS6100) manufactured by Seiko Instruments Inc. This value was a mean value of three samples. The greater value indicates the better high-temperature rigidity of the material and the more improved heat resistance.
- Measurement mode: Tensile mode;
- Temperature conditions: 1st step: keep at 50° C.×2 minutes, 2nd step: raise temperature from 50° C. to 270° C.;
- Rate of temperature rise: 2° C./minute;
- Measurement frequency: 1 Hz;
- Minimum tension: 200 mN;
- Strain amplitude: 10 μm;
- Tensile gain: 1.5
- Initial value of force amplitude: 2000 mN Number-Average Dispersed Particle Diameter A center part of the injection-molded mirror-surface plate for evaluation of reflector described above was cut in a direction orthogonal to the flow direction of the resin, and a thin piece of not greater than 0.1 μm was cut at −20° C. from the center area of the cross section. The thin piece was observed at 20 thousand-fold magnification using a transmission electron microscope H-7100 manufactured by Hitachi, Ltd. (resolution (particle image): 0.38 nm, magnification: 500 to 600 thousand-fold). The maximum diameter and the minimum diameter were measured for each of any 100 particles with respect to the dispersed phases of the amorphous resin (c), and their mean value was specified as dispersed particle diameter of the particle. The mean value of the dispersed particle diameters was then specified as the number-average dispersed particle diameter.

Dispersed Phases of Amorphous Resin Having Dispersed Particle Diameter of not Less than 1000 nm (%)

A center part of the injection-molded mirror-surface plate described above was cut in a direction orthogonal to the flow direction of the resin, and a thin piece of not greater than 0.1 μm was cut at −20° C. from the center area of the cross section. The thin piece was observed at 20 thousand-fold magnification using a transmission electron microscope H-7100 manufactured by Hitachi, Ltd. (resolution (particle image): 0.38 nm, magnification: 500 to 600 thousand-fold). The maximum diameter and the minimum diameter were measured for each of any 100 particles with respect to the dispersed phases of the amorphous resin (c), and their mean value was specified as dispersed particle diameter of the particle. The percentage of the number of the dispersed phases having the above dispersed particle diameter of not less than 1000 nm to the total number of dispersed phases was then calculated.

Polymerization of (a) PPS Resin (a-1)

The procedure fed 8267.37 g (70.00 mol) of 47.5% sodium hydrosulfide, 2957.21 g (70.97 mol) of sodium hydroxide 96%, 11434.50 g (115.50 mol) of N-methyl-2-pyrrolidone (NMP), 861.00 g (10.5 mol) of sodium acetate and 10500 g of ion exchanged water in a 70-liter autoclave with an agitator and gradually heated the mixture to 245° C. over about 3 hours at ordinary pressure under nitrogen stream. After 14780.1 g of water and 280 g of NMP were distilled out, the reaction vessel was cooled down to 160° C. The remaining amount of water in the system per 1 mol of the fed alkali metal sulfide was 1.06 mol including the water content consumed for hydrolysis of NMP. The release amount of hydrogen sulfide was 0.02 mol per 1 mol of the fed alkali metal sulfide.

The procedure subsequently added 10235.46 g (69.63 mol) of p-dichlorobenzene and 9009.00 g (91.00 mol) of NMP, sealed the reaction vessel under nitrogen gas, and raised the temperature to 238° C. at a rate of 0.6° C./minute with stirring at 240 rpm. After the reaction at 238° C. for 95 minutes, the procedure further raised the temperature to 270° C. at a rate of 0.8° C./minute. After the reaction at 270° C. for 100 minutes, the procedure cooled down the reaction vessel to 250° C. at a rate of 1.3° C./minute, while injecting 1260 g (70 mol) of water into the reaction vessel over 15 minutes. The procedure subsequently cooled down the reaction vessel to 200° C. at a rate of 1.0° C./minute and then rapidly cooled down to about room temperature.

The procedure took the content out, diluted the content with 26300 g of NMP and filtered the solid substance from the solvent with a sieve (80 mesh). The obtained particles were washed with 31900 g of NMP and were filtered. The particles were then washed with 56000 g of ion exchanged water several times, were filtered, were subsequently washed with 70000 g of a 0.05% by weight of acetic acid aqueous solution and were filtered. After being washed with 70000 g of ion exchanged water and filtered, the obtained water-containing PPS particles were dried with hot air at 80° C. and were dried under reduced pressure at 120° C. The resulting PPS resin a-1 had the melt viscosity of 60 Pa·s (300° C., shear rate of 1000/s).

Polymerization of (a) PPS Resin (a-2)

The procedure fed 8267.37 g (70.00 mol) of 47.5% sodium hydrosulfide, 2957.21 g (70.97 mol) of sodium hydroxide 96%, 11434.50 g (115.50 mol) of N-methyl-2-pyrrolidone (NMP), 2583.00 g (31.50 mol) of sodium acetate and 10500 g of ion exchanged water in a 70-liter autoclave with an agitator and gradually heated the mixture to 245° C. over about 3 hours at ordinary pressure under nitrogen stream. After 14780.1 g of water and 280 g of NMP were distilled out, the reaction vessel was cooled down to 160° C.

The remaining amount of water in the system per 1 mol of the fed alkali metal sulfide was 1.06 mol including the water content consumed for hydrolysis of NMP. The release amount of hydrogen sulfide was 0.02 mol per 1 mol of the fed alkali metal sulfide.

The procedure subsequently added 10235.46 g (69.63 mol) of p-dichlorobenzene and 9009.00 g (91.00 mol) of NMP, sealed the reaction vessel under nitrogen gas, and raised the temperature to 238° C. at a rate of 0.6° C./minute with stirring at 240 rpm. After the reaction at 238° C. for 95 minutes, the procedure further raised the temperature to 270° C. at a rate of 0.8° C./minute. After the reaction at 270° C. for 100 minutes, the procedure cooled down the reaction vessel to 250° C. at a rate of 1.3° C./minute, while injecting 1260 g (70 mol) of water into the reaction vessel over 15 minutes. The procedure subsequently cooled down the reaction vessel to 200° C. at a rate of 1.0° C./minute and then rapidly cooled down to about room temperature.

The procedure took the content out, diluted the content with 26300 g of NMP and filtered the solid substance from the solvent with a sieve (80 mesh). The obtained particles were washed with 31900 g of NMP and were filtered. The particles were then washed with 56000 g of ion exchanged water several times, were filtered, were subsequently washed with 70000 g of a 0.05% by weight of acetic acid aqueous solution and were filtered. After being washed with 70000 g of ion exchanged water and filtered, the obtained water-containing PPS particles were dried with hot air at 80° C. and were dried under reduced pressure at 120° C. The resulting PPS resin a-2 had the melt viscosity of 200 Pa·s (300° C., shear rate of 1000/s).

Polymerization of (a) PPS Resin (a-3)

The procedure fed 8.27 kg (70.00 mol) of 47.5% sodium hydrosulfide, 2.91 kg (69.80 mol) of sodium hydroxide 96%, 11.45 kg (115.50 mol) of N-methyl-2-pyrrolidone (NMP), 1.89 kg (23.10 mol) of sodium acetate and 10.5 kg of ion exchanged water in a 70-liter autoclave with an agitator and a bottom stop valve and gradually heated the mixture to 245° C. over about 3 hours at ordinary pressure under nitrogen stream. After 14.78 kg of water and 0.28 kg of NMP were distilled out, the reaction vessel was cooled down to 200° C. The remaining amount of water in the system per 1 mol of the fed alkali metal sulfide was 1.06 mol including the water content consumed for hydrolysis of NMP. The release amount of hydrogen sulfide was 0.02 mol per 1 mol of the fed alkali metal sulfide.

After cooling down to 200° C., the procedure added 10.45 kg (71.07 mol) of p-dichlorobenzene and 9.37 kg (94.50 mol) of NMP, sealed the reaction vessel under nitrogen gas and raised the temperature from 200° C. to 270° C. at a rate of 0.6° C./minute with stirring at 240 rpm. After the reaction at 270° C. for 100 minutes, the procedure opened the bottom stop valve of the autoclave, flushed the content to a vessel with an agitator over 15 minutes under pressure of nitrogen and stirred the flushed content at 250° for some time to remove a most part of NMP.

The procedure placed the obtained solid substance and 76 liters of ion exchanged water in an autoclave with an agitator, washed at 70° C. for 30 minutes, and performed suction filtration with a glass filter. The procedure subsequently poured 76 liters of ion exchanged water heated to 70° C. onto the glass filter and obtained cake by suction filtration.

The procedure placed the obtained cake and 90 liters of ion exchanged water in an autoclave with an agitator and added acetic acid to control pH to 7. After that, the procedure replaced the inside of the autoclave with nitrogen and subsequently raised the temperature to 192° C. and kept the temperature for 30 minutes. The procedure then cooled down the autoclave and took the content out.

After the content was subject to suction filtration with a glass filter, the procedure poured 76 liters of ion exchanged water at 70° C. onto the glass filter and obtained cake by suction filtration. Dried PPS was obtained by drying the obtained cake at 120° C. under nitrogen stream.

The obtained PPS resin had the melt viscosity of 50 Pa·s (300° C., shear rate of 1000/s). The resulting PPS resin was subject to thermal oxidation treatment at 220° C. under oxygen stream to have the melt viscosity of 130 Pa·s (300° C., shear rate of 1000/s). This gave PPS resin a-3.

(b) Mica
- (b-1) mica, volume-average particle diameter: 40 μm, number-average thickness: 0.50 μm, aspect ratio: 80;
- (b-2) mica, volume-average particle diameter: 24 μm, number-average thickness: 0.30 μm, aspect ratio: 80;
- (b-3) mica, volume-average particle diameter: 24 μm, number-average thickness: 0.20 μm, aspect ratio: 120;
- (b-4) mica, volume-average particle diameter: 40 μm, number-average thickness: 0.33 μm, aspect ratio: 120;
- (b-5) mica, volume-average particle diameter: 20 μm, number-average thickness: 0.5 μm, aspect ratio: 40;
- (b-6) mica, volume-average particle diameter: 10 μm, number-average thickness: 0.075 μm, aspect ratio: 133;
- (b-7) mica, volume-average particle diameter: 35 μm, number-average thickness: 0.8 μm, aspect ratio: 44;
- (b-8) mica, volume-average particle diameter: 18 μm, number-average thickness: 0.12 μm, aspect ratio: 150;
- (b-9) mica, volume-average particle diameter: 8 μm, number-average thickness: 0.045 μm, aspect ratio: 177; and
- (b-10) mica, volume-average particle diameter: 64 μm, number-average thickness: 0.30 μm, aspect ratio: 213.

The above volume-average particle diameter was determined by a laser diffraction/scattering particle diameter distribution measuring apparatus LA-300 manufactured by HORIBA, Ltd. The thickness was determined by observation at 2000-fold magnification using a scanning electron microscope (SEM) (JSM-6360LV manufactured by JEOL Ltd.) The thickness was measured with respect to 10 mica particles selected at random from the image, and the number-average value was specified as the thickness. The aspect ratio was calculated as the volume-average particle diameter (μm)/number-average thickness (μm).

(c) at Least One Amorphous Resin Selected Among Polyether Imide Resins and Polyether Sulfone Resins
  c-1: polyether imide resin ("ULTEM" 1010 manufactured by SABIC Innovative Plastics); and
  c-2: polyether sulfone resin ("SUMIKAEXCEL" 3600G manufactured by Sumitomo Chemical Company, Limited).

(d) Compatibilizer Having at Least One Group Selected Among Epoxy Group, Amino Group and Isocyanate Group
  d-1: 3-isocyanate propyltriethoxysilane (KBE-9007 manufactured by Shin-Etsu Chemical Co., Ltd.); and
  d-2: 2-(3,4-epoxycyclohexyl)ethyltrimethoxysilane (KBM-303 manufactured by Shin-Etsu Chemical Co., Ltd.)

Examples 1 to 14, Comparative Examples 1 to 4

The respective components shown in Table 1, 2 or 3 were dry-blended at the rates shown in Table 1, 2 or 3, were melt-kneaded using a twin-screw extruder TEX 30α with a vacuum vent manufactured by the Japan Steel Works, LTD. (screw diameter: 30 mm, L/D=45, five kneading sections, fully intermeshing-type screws rotating in the same direction) under the conditions of the screw rotation speed of 300 rpm, the discharge rate of 20 kg/hr and the cylinder temperature set to control the die-discharge resin temperature to 310° C., and were pelletized with a strand cutter. The pellets dried at 130° C. for 8 hours were subject to injection molding and were evaluated for the heat sag amount, the bar flow length, the material specific gravity, the surface smoothness, the reflector properties, the appearance of the molded product, the impact property and the high-temperature rigidity. The results of evaluation are shown in Tables 1, 2 and 3.

Examples 15 to 19

The respective components shown in the first kneading column of Table 4, 5 or 6 were dry-blended at the rates shown in Table 4, 5 or 6, were melt-kneaded using a twin-screw extruder TEX 30α with a vacuum vent manufactured by the Japan Steel Works, LTD. (screw diameter: 30 mm, L/D=45, five kneading sections, fully intermeshing-type screws rotating in the same direction) under the conditions of the screw rotation speed of 300 rpm, the discharge rate of 20 kg/hr and the cylinder temperature set to control the die-discharge resin temperature to 330° C., and were pelletized with the strand cutter. These pellets (first kneaded resin composition), the PPS resin (a) and the mica (b) were subsequently dry-blended at the rates shown in the second kneading column of Table 4, 5 or 6, were further melt-kneaded under the same conditions as those described above and were pelletized with the strand cutter. The resulting PPS resin compositions respectively had the final compositions shown in Tables 4, 5 and 6. The pellets dried at 130° C. for 8 hours were subject to injection molding and were evaluated for the heat sag amount, the bar flow length, the material specific gravity, the surface smoothness, the reflector properties, the appearance of the molded product, the impact property, the high-temperature rigidity, the number-average dispersed particle diameter of the amorphous resin (c) and the number of dispersed phases exceeding 1000 nm of the amorphous resin (c). The results of evaluation are shown in Tables 4, 5 and 6.

Example 20

The respective components shown in Table 7 were dry-blended at the rates shown in Table 7, were melt-kneaded using a twin-screw extruder TEX 30α with a vacuum vent manufactured by the Japan Steel Works, LTD. (screw diameter: 30 mm, L/D=45, five kneading sections, fully intermeshing-type screws rotating in the same direction) under the conditions of the screw rotation speed of 300 rpm, the discharge rate of 20 kg/hr and the cylinder temperature set to control the die-discharge resin temperature to 330° C., and were pelletized with the strand cutter. The pellets dried at 130° C. for 8 hours were subject to injection molding and were evaluated for the heat sag amount, the bar flow length, the material specific gravity, the surface smoothness, the reflector properties, the appearance of the molded product, the impact property, the high-temperature rigidity, the number-average dispersed particle diameter of the amorphous resin (c) and the number of dispersed phases exceeding 1000 nm of the amorphous resin (c). The results of evaluation are shown in Table 7.

Example 21

The respective components shown in Table 7 were dry-blended at the rates shown in Table 7, were melt-kneaded using a twin-screw extruder TEX 30α with a vacuum vent manufactured by the Japan Steel Works, LTD. (screw diameter: 30 mm, L/D=45, five kneading sections, fully intermeshing-type screws rotating in the same direction) under the conditions of the screw rotation speed of 300 rpm, the discharge rate of 20 kg/hr and the cylinder temperature set to control the die-discharge resin temperature to 330° C., and were pelletized with the strand cutter. The pellets were then further melt-kneaded under the same conditions as those described above and were pelletized with the strand cutter. The pellets dried at 130° C. for 8 hours were subject to injection molding and were evaluated for the heat sag amount, the bar flow length, the material specific gravity, the surface smoothness, the reflector properties, the appearance of the molded product, the impact property, the high-temperature rigidity, the number-average dispersed particle diameter of the amorphous resin (c) and the number of dispersed phases exceeding 1000 nm of the amorphous resin (c). The results of evaluation are shown in Table 7.

Example 22

The respective components shown in the first kneading column of Table 7 were dry-blended at the rates shown in Table 7, were melt-kneaded using a twin-screw extruder TEX 30α with a vacuum vent manufactured by the Japan Steel Works, LTD. (screw diameter: 30 mm, L/D=45, five kneading sections, fully intermeshing-type screws rotating in the same direction) under the conditions of the screw rotation speed of 300 rpm, the discharge rate of 20 kg/hr and the cylinder temperature set to control the die-discharge resin temperature to 330° C., and were pelletized with the strand cutter. These pellets (first kneaded resin composition) and the PPS resin (a) were subsequently dry-blended at the rates shown in the second kneading column of Table 7, were further melt-kneaded under the same conditions as those described above and were pelletized with the strand cutter. The resulting PPS resin composition had the final composition shown in Table 7. The pellets dried at 130° C. for 8 hours were subject to injection molding and were evaluated for the heat sag amount, the bar flow length, the material specific gravity, the surface smoothness, the reflector properties, the appearance of the molded product, the impact property, the high-temperature rigidity, the number-average dispersed particle diameter of the amorphous resin (c) and the number of dispersed phases exceeding 1000 nm of the amorphous resin (c). The results of evaluation are shown in Table 7.

TABLE 1

|  |  | EX 1 | EX 2 | EX 3 | EX 4 | EX 5 | EX 6 |
|---|---|---|---|---|---|---|---|
| Type of PPS (a) |  | a-1 | a-1 | a-1 | a-1 | a-1 | a-1 |
| Amount of PPS (a) | parts by weight | 100 | 100 | 100 | 100 | 100 | 100 |
| Type of PPS (a) |  | — | — | — | — | — | — |
| Amount of PPS (a) | parts by weight | — | — | — | — | — | — |
| Type of Mica (b) |  | b-1 | b-2 | b-3 | b-4 | b-6 | b-6 |

TABLE 1-continued

|  |  | EX 1 | EX 2 | EX 3 | EX 4 | EX 5 | EX 6 |
|---|---|---|---|---|---|---|---|
| Amount of Mica (b) | parts by weight | 10 | 10 | 10 | 10 | 10 | 20 |
| Particle Diameter of Mica (b) | μm | 40 | 24 | 24 | 40 | 10 | 10 |
| Aspect Ratio of Mica (b) |  | 80 | 80 | 120 | 120 | 133 | 133 |
| Heat Sag Amount (0.7 mmt) | mm | 18.0 | 17.0 | 15.0 | 16.0 | 13.5 | 12.7 |
| Bar Flow Length (0.5 mmt) | mm | 84 | 89 | 90 | 86 | 113 | 107 |
| Material Speciftc Gravity | g/cm$^3$ | 1.42 | 1.41 | 1.41 | 1.40 | 1.41 | 1.45 |
| PPS Resin (a)/Non-Newtonian Index N |  | — | 1.19 | 1.19 | 1.19 | 1.19 | 1.19 |
| Centerline Waviness Ra (1.0 mmt) | μm | 1.20 | 1.15 | 0.15 | 0.20 | 0.06 | 0.09 |
| Arithmetic Mean Waviness Wa (1.0 mmt) | μm | 3.50 | 3.10 | 1.59 | 1.70 | 0.98 | 1.06 |
| Non-Treated/Total Reflectivity (1.0 mmt) | % | 88.0 | 87.9 | 87.6 | 87.5 | 89.0 | 89.2 |
| Regular Reflectance (1.0 mmt) | % | 85.5 | 85.4 | 85.4 | 85.1 | 88.3 | 88.2 |
| Diffuse Reflectance (1.0 mmt) | % | 2.5 | 2.5 | 2.2 | 2.4 | 0.7 | 0.9 |
| Heat-Treated/ Total Reflectivity (1.0 mmt) | % | 87.8 | 87.6 | 87.4 | 87.6 | 88.8 | 89.1 |
| Regular Reflectance (1.0 mmt) | % | 84.6 | 84.6 | 84.9 | 85.0 | 87.9 | 88.0 |
| Diffuse Reflectance (1.0 mmt) | % | 3.2 | 3.0 | 2.5 | 2.6 | 0.9 | 1.1 |
| After Metal Deposition/Heat Treatment/ Appearance of Molded Product | ○, Δ, x | Δ | Δ | Δ | Δ | ○ | ○ |
| Falling Ball Impact Test | ○, Δ, x | Δ | Δ | Δ | Δ | Δ | Δ |
| Storage Modulus E'/ Measurement Temp 50° C. 50° C. | GPa | 3.45 | 3.66 | 3.82 | 3.78 | 4.58 | 5.50 |
| /Measurement Temp 80° C. | GPa | 3.36 | 3.59 | 3.75 | 3.69 | 4.49 | 5.39 |
| /Measurement Temp 110° C. | GPa | 1.76 | 1.91 | 2.01 | 1.95 | 2.39 | 2.87 |
| /Measurement Temp 150° C. | GPa | 0.68 | 0.75 | 0.86 | 0.82 | 0.94 | 1.13 |
| /Measurement Temp 180° C. | GPa | 0.57 | 0.64 | 0.72 | 0.68 | 0.80 | 0.96 |

TABLE 2

|  |  | EX 7 | EX 8 | EX 9 | EX 10 | EX 11 | EX 12 |
|---|---|---|---|---|---|---|---|
| Type of PPS (a) |  | — | a-1 | a-1 | a-1 | a-1 | a-1 |
| Amount of PPS (a) | parts by weight | — | 50 | 40 | 30 | 20 | 100 |
| Type of PPS (a) |  | a-3 | a-3 | a-3 | a-3 | a-3 | — |
| Amount of PPS (a) | parts by weight | 100 | 50 | 60 | 70 | 80 | — |
| Type of Mica (b) |  | b-6 | b-6 | b-6 | b-6 | b-6 | b-8 |
| Amount of Mica (b) | parts by weight | 20 | 20 | 20 | 20 | 20 | 10 |
| Particle Diameter of Mica (b) | μm | 10 | 10 | 10 | 10 | 10 | 18 |
| Aspect Ratio of Mica (b) |  | 133 | 133 | 133 | 133 | 133 | 150 |
| Heat Sag Amount (0.7 mmt) | mm | 8.5 | 10.6 | 10.5 | 10.3 | 10.4 | 12.0 |
| Bar Flow Length (0.5 mmt) | mm | 96 | 100 | 100 | 100 | 98 | 92 |
| Material Specific Gravity | g/cm$^3$ | 1.45 | 1.45 | 1.45 | 1.45 | 1.45 | 1.41 |
| PPS Resin (a)/ Non-Newtonian Index N |  | 1.48 | 1.25 | 1.26 | 1.30 | 1.40 | 1.19 |
| Centerline Waviness Ra (1.0 mmt) | μm | 0.17 | 0.08 | 0.08 | 0.08 | 0.09 | 0.07 |
| Arithmetic Mean Waviness Wa (1.0 mmt) | μm | 6.27 | 0.20 | 0.21 | 0.22 | 0.23 | 1.18 |
| Non-Treated/ Total Reflectivity (1.0 mmt) | % | 86.8 | 89.1 | 87.6 | 87.6 | 88.1 | 89.0 |
| Regular Reflectance (1.0 mmt) | % | 85.1 | 88.1 | 86.6 | 86.5 | 86.9 | 88.1 |
| Diffuse Reflectance (1.0 mmt) | % | 1.8 | 1.0 | 1.0 | 1.1 | 1.1 | 0.9 |
| Heat-Treated/Total Reflectivity (1.0 mmt) | % | 87.1 | 89.0 | 87.0 | 86.8 | 88.0 | 88.8 |
| Regular Reflectance (1.0 mmt) | % | 85.0 | 87.8 | 85.6 | 85.4 | 86.0 | 87.6 |
| Diffuse Reflectance (1.0 mmt) | % | 2.1 | 1.2 | 1.4 | 1.4 | 1.4 | 1.2 |
| After Metal Deposition/Heat Treatment/ Appearance of Molded Product | ○, Δ, x | Δ | ○ | ○ | ○ | ○ | ○ |
| Falling Ball Impact Test | ○, Δ, x | Δ | Δ | Δ | Δ | Δ | Δ |
| Storage Modulus E'/Measurement Temp 50° C. | GPa | 6.64 | 6.07 | 6.23 | 6.35 | 6.48 | 5.04 |
| /Measurement Temp 80° C. | GPa | 6.15 | 5.77 | 5.85 | 5.96 | 6.05 | 4.94 |
| /Measurement Temp 110° C. | GPa | 3.75 | 3.31 | 3.42 | 3.55 | 3.61 | 2.63 |
| /Measurement Temp 150° C. | GPa | 1.33 | 1.23 | 1.26 | 1.30 | 1.31 | 1.03 |
| /Measurement Temp 180° C. | GPa | 1.09 | 1.03 | 1.04 | 1.06 | 1.07 | 0.88 |

TABLE 3

|  |  | EX 13 | EX 14 | COMP EX 1 | COMP EX 2 | COMP EX 3 | COMP EX 4 |
|---|---|---|---|---|---|---|---|
| Type of PPS (a) |  | a-1 | a-1 | a-1 | a-1 | a-1 | a-1 |
| Amount of PPS (a) | parts by weight | 100 | 100 | 100 | 100 | 100 | 100 |
| Type of PPS (a) |  | — | — | — | — | — | — |
| Amount of PPS (a) | parts by weight | — | — | — | — | — | — |
| Type of Mica (b) |  | b-9 | b-10 | — | b-5 | b-5 | b-7 |
| Type of Mica (b) | parts by weight | 10 | 10 | — | 10 | 35 | 10 |
| Amount of Mica (b) | μm | 8 | 64 |  | 20 | 20 | 35 |
| Aspect Ratio of Mica (b) |  | 177 | 213 |  | 40 | 40 | 44 |
| Heat Sag Amount (0.7 mmt) | mm | 11.9 | 12.2 | 32.0 | 19.5 | 11.5 | 21.0 |
| Bar Flow Length (0.5 mmt) | mm | 114 | 85 | 117 | 90 | 67 | 85 |
| Material Specific Gravity | g/cm$^3$ | 1.41 | 1.41 | 1.34 | 1.42 | 1.60 | 1.60 |

TABLE 3-continued

|  |  | EX 13 | EX 14 | COMP EX 1 | COMP EX 2 | COMP EX 3 | COMP EX 4 |
|---|---|---|---|---|---|---|---|
| PPS Resin (a)/ Non-Newtonian Index N | — | 1.19 | 1.19 | 1.19 | 1.19 | 1.19 | 1.19 |
| Centerline Waviness Ra (1.0 mmt) | μm | 0.05 | 0.35 | 0.08 | 1.50 | 1.95 | 2.20 |
| Arithmetic Mean Waviness Wa (1.0 mmt) | μm | 0.96 | 1.99 | 5.50 | 3.60 | 3.61 | 3.60 |
| Non-Treated/ Total Reflectivity (1.0 mmt) | % | 89.0 | 89.0 | 87.8 | 87.5 | 87.0 | 87.0 |
| Regular Reflectance (1.0 mmt) | % | 88.4 | 87.5 | 86.3 | 83.5 | 82.5 | 82.8 |
| Diffuse Reflectance (1.0 mmt) | % | 0.8 | 1.5 | 1.5 | 4.0 | 4.5 | 4.2 |
| Heat-Treated/Total Reflectivity (1.0 mmt) | % | 88.8 | 88.8 | 87.5 | 87.4 | 86.8 | 87.1 |
| Regular Reflectance (1.0 mmt) | % | 88.0 | 87.1 | 84.4 | 83.1 | 82.0 | 82.6 |
| Diffuse Reflectance (1.0 mmt) | % | 0.8 | 1.7 | 3.1 | 4.3 | 4.8 | 4.5 |
| After Metal Deposition/Heat Treatment/ Appearance of Molded Product | ○, Δ, x | ○ | Δ | Δ | x | x | x |
| Falling Ball Impact Test | ○, Δ, x | Δ | Δ | Δ | Δ | x | Δ |
| Storage Modulus E'/Measurement Temp 50° C. | GPa | 5.06 | 5.05 | 3.18 | 3.23 | 6.50 | 3.15 |
| /Measurement Temp 80° C. | GPa | 5.00 | 5.01 | 3.04 | 3.01 | 6.20 | 3.06 |
| /Measurement Temp 110° C. | GPa | 2.80 | 2.81 | 1.36 | 1.45 | 3.85 | 1.45 |
| /Measurement Temp 150° C. | GPa | 1.15 | 1.16 | 0.31 | 0.58 | 1.56 | 0.57 |
| /Measurement Temp 180° C. | GPa | 0.94 | 0.95 | 0.25 | 0.45 | 1.29 | 0.41 |

TABLE 4

|  |  | EX 15 | | | EX 16 | | |
|---|---|---|---|---|---|---|---|
|  |  | 1st Kneading | 2nd Kneading | Final Composition | 1st Kneading | 2nd Kneading | Final Composition |
| Type of PPS (a) |  | a-2 | a-1 | a-1/a-2 | a-2 | a-1 | a-1/a-2 |
| Amount of PPS (a) | parts by weight | 100 | 100 | 72.5/27.5 | 100 | 100 | 72.5/27.5 |
| Type of Mica (b) |  |  | b-3 | b-3 |  | b-6 | b-6 |
| Amount of Mica (b) | parts by weight |  | 14 | 10 |  | 14 | 10 |
| Particle Diameter of Mica | μm |  | 24 |  |  | 10 |  |
| Aspect Ratio of Mica |  |  | 120 |  |  | 133 |  |
| Type of Amorphous Resin (c) |  | c-1 |  | c-1 | c-1 |  | c-1 |
| Amount of Amorphous Resin (c) | parts by weight | 56 |  | 15 | 56 |  | 15 |
| Type of Compatibilizer (d) |  | d-1 |  | d-1 | d-1 |  | d-1 |
| Amount of Compatibilizer (d) | parts by weight | 3.8 |  | 1 | 3.8 |  | 1 |
| Resin Composition by 1st Kneading | parts by weight |  | 59 |  |  | 59 |  |
| Number-Average Dispersed Particle Diamter of (c) | nm | — | — | 325 | — | — | 322 |
| Dispersed Phases Over 1000 nm in (c) | % | — | — | 0 | — | — | 0 |
| Heat Sag Amount (0.7 mmt) | mm | — | — | 18.0 | — | — | 15.8 |
| Bar Flow Length (0.5 mmt) | mm | — | — | 94 | — | — | 92 |
| Material Specific Gravity | g/cm³ | — | — | 1.41 | — | — | 1.40 |
| PPS Resin (a)/Non-Newtonian Index N | — | — | — | 1.27 | — | — | 1.27 |
| Centerline Waviness Ra (1.0 mmt) | μm | — | — | 0.11 | — | — | 0.04 |
| Arithmetic Mean Waviness Wa( 1.0 mmt) | μm | — | — | 1.38 | — | — | 0.80 |
| Non-Treated/Total Reflectivity (1.0 mmt) | % | — | — | 87.8 | — | — | 89.0 |
| Regular Reflectance (1.0 mmt) | % | — | — | 85.8 | — | — | 88.5 |
| Diffuse Reflectance (1.0 mmt) | % | — | — | 2.0 | — | — | 0.5 |
| Heat-Treated/Total Reflectivity (1.0 mmt) | % | — | — | 87.6 | — | — | 88.8 |
| Regular Reflectance (1.0 mmt) | % | — | — | 85.4 | — | — | 88.1 |
| Diffuse Reflectance (1.0 mmt) | % | — | — | 2.2 | — | — | 0.7 |
| After Metal Deposition/Heat Treatment/ Appearance of Molded Product | ○, Δ, x | — | — | Δ | — | — | ○ |
| Falling Ball Impact Test | ○, Δ, x | — | — | ○ | — | — | ○ |
| Storage Modulus E'/Measurement Temp 50° C. | GPa | — | — | 3.80 | — | — | 4.56 |
| /Measurement Temp 80° C. | GPa | — | — | 3.77 | — | — | 4.48 |
| /Measurement Temp 110° C. | GPa | — | — | 2.20 | — | — | 2.52 |
| /Measurement Temp 150° C. | GPa | — | — | 0.95 | — | — | 1.06 |
| /Measurement Temp 180° C. | GPa | — | — | 0.82 | — | — | 0.95 |

TABLE 5

|  |  | EX 17 | | | EX 18 | | |
|---|---|---|---|---|---|---|---|
|  |  | 1st Kneading | 2nd Kneading | Final Composition | 1st Kneading | 2nd Kneading | Final Composition |
| Time of PPS (a) |  | a-1 | a-1 | a-1 | a-2 | a-2 | a-1/a-2 |
| Amount of PPS (a) | parts by weight | 100 | 100 | 100 | 100 | 100 | 72.5/27.5 |
| Type of Mica (b) |  |  | b-6 | b-6 |  | b-6 | b-6 |
| Amount of Mica (b) | parts by weight |  | 14 | 10 |  | 14 | 10 |
| Particle Diameter of Mica (b) | μm |  | 10 |  |  | 10 |  |
| Aspect Ratio of Mica (b) |  |  | 133 |  |  | 133 |  |

TABLE 5-continued

|  |  | EX 17 | | | EX 18 | | |
|---|---|---|---|---|---|---|---|
|  |  | 1st Kneading | 2nd Kneading | Final Composition | 1st Kneading | 2nd Kneading | Final Composition |
| Type of Amorphous Resin (c) |  | c-1 |  | c-1 | c-1 |  | c-1 |
| Amount of Amorphous Resin (c) | parts by weight | 56 |  | 15 | 56 |  | 15 |
| Type of Compatibilizer (d) |  | d-1 |  | d-1 | d-2 |  | d-2 |
| Amount of Compatibilzer (d) | parts by weight | 3.8 |  | 1 | 3.8 |  | 1 |
| Resin Composition by 1st Kneading | parts by weight |  | 59 |  |  | 59 |  |
| Number-Average Dispersed Particle Diamter of (c) | nm | — | — | 615 | — | — | 586 |
| Dispersed Phases Over 1000 nm in (c) | % | — | — | 0.56 | — | — | 0.43 |
| Heat Sag Amount (0.7 mmt) | mm | — | — | 18.3 | — | — | 16.5 |
| Bar Flow Length (0.5 mmt) | mm | — | — | 98 | — | — | 86 |
| Material Specific Gravity | g/cm³ | — | — | 1.42 | — | — | 1.41 |
| PPS Resin (a)/Non-Newtonian Index N | — | — | — | 1.27 | — | — | 1.27 |
| Centerline Waviness Ra(1.0 mmt) | μm | — | — | 0.07 | — | — | 0.05 |
| Arithmetic Mean Waviness Wa (1.0 mmt) | μm | — | — | 0.95 | — | — | 0.88 |
| Non-Treated/Total Reflectivity (1.0 mmt) | % | — | — | 88.8 | — | — | 88.8 |
| Regular Reflectance (1.0 mmt) | % | — | — | 87.7 | — | — | 88.1 |
| Diffuse Reflectance (1.0 mmt) | % | — | — | 0.9 | — | — | 0.7 |
| Heat-Treated/Total Reflectivity (1.0 mmt) | % | — | — | 88.4 | — | — | 88.6 |
| Regular Reflectance (1.0 mmt) | % | — | — | 87.3 | — | — | 87.7 |
| Diffuse Reflectance (1.0 mmt) | % | — | — | 1.1 | — | — | 0.9 |
| After Metal Deposition/Heat Treatment/ Appearance of Molded Product | ○, Δ, x | — | — | ○ | — | — | ○ |
| Falling Ball Impact Test | ○, Δ, x | — | — | ○ | — | — | ○ |
| Storage Modulus E'/Measurement Temp 50° C. | GPa | — | — | 4.55 | — | — | 4.56 |
| /Measurement Temp 80° C. | GPa | — | — | 4.47 | — | — | 4.46 |
| /Measurement Temp 110° C. | GPa | — | — | 2.41 | — | — | 2.50 |
| /Measurement Temp 150° C. | GPa | — | — | 0.99 | — | — | 1.02 |
| /Measurement Temp 180° C. | GPa | — | — | 0.85 | — | — | 0.92 |

TABLE 6

|  |  | EX 19 | | |
|---|---|---|---|---|
|  |  | 1st Kneading | 2nd Kneading | Final Composition |
| Type of PPS (a) |  | a-2 | a-1 | a-1/a-2 |
| Amount of PPS (a) | parts by weight | 100 | 100 | 72.5/27.5 |
| Type of Mica (b) |  |  | b-6 | b-6 |
| Amount of Mica (b) | parts by weight |  | 14 | 10 |
| Particle Diameter of Mica (b) | μm |  | 10 |  |
| Aspect Ratio of Mica (b) |  |  | 133 |  |
| Type of Amorphous Resin (c) |  | c-2 |  | c-2 |
| Amount of Amorphous Resin (c) | parts by weight | 56 |  | 15 |
| Type of Compatibilizer (d) |  | d-1 |  | d-1 |
| Amount of Compatibilizer (d) | parts by weight | 3.8 |  | 1 |
| Resin Composition by 1st Kneading | parts by weight |  | 59 |  |
| Number-Average Dispersed Particle Diameter of (c) | nm | — | — | 337 |
| Dispersed Phases Over 1000 nm in (c) | % | — | — | 0 |
| Heat Sag Amount(0.7 mmt) | mm | — | — | 16.0 |
| Bar Flow Length(0.5 mmt) | mm | — | — | 93 |
| Material Specific Gravity | g/cm³ | — | — | 1.41 |
| PPS Resin (a)/Non-Newtonian Index N | — | — | — | 1.28 |
| Centerline Waviness Ra(1.0 mmt) | μm | — | — | 0.04 |
| Arithmetic Mean Waviness Wa(1.0 mmt) | μm | — | — | 0.82 |
| Non-Treated/Total Reflectivity (1.0 mmt) | % | — | — | 88.7 |
| Regular Reflectance(1.0 mmt) | % | — | — | 88.1 |
| Diffuse Reflectance(1.0 mmt) | % | — | — | 0.6 |
| Heat-Treated/Total Reflectivity(1.0 mmt) | % | — | — | 88.4 |
| Regular Reflectance(1.0 mmt) | % | — | — | 87.6 |
| Diffuse Reflectance(1.0 mmt) | % | — | — | 0.8 |
| After Metal Deposition/Heat Treatment/ Appearance of Molded Product | ○, Δ, x | — | — | ○ |
| Falling Ball Impact Test | ○, Δ, x | — | — | ○ |
| Storage Modulus E'/Measurement Temp 50° C. | GPa | — | — | 4.54 |
| /Measurement Temp 80° C. | GPa | — | — | 4.46 |
| /Measurement Temp 110° C. | GPa | — | — | 2.52 |
| /Measurement Temp 150° C. | GPa | — | — | 1.06 |
| /Measurement Temp 180° C. | GPa | — | — | 0.94 |

TABLE 7

|  |  | Ex 20 | EX 21 | EX 22 1st Kneading | 2nd kneading | Final Composition |
|---|---|---|---|---|---|---|
| Type of PPS (a) |  | a-1 | a-1 | a-1 | a-1 | a-1 |
| Amount of PPS (a) | parts by weight | 100 | 100 | 100 | 100 | 100 |
| Type of Mica (b) |  | b-6 | b-6 | b-6 |  | b-6 |
| Amount of Mica (b) | parts by weight | 10 | 10 | 80 |  | 10 |
| Particle Diameter of Mica (b) | μm | 10 | 10 | 10 |  | 10 |
| Aspect Ratio of Mica (b) |  | 133 | 133 | 133 |  | 133 |
| Type of Amorphous Resin (c) |  | c-1 | c-1 | c-1 |  | c-1 |
| Amount of Amorphous Resin (c) | parts by weight | 15 | 15 | 90 |  | 15 |
| Type of Compatibilizer (d) |  | d-1 | d-1 | d-1 |  | d-1 |
| Amount of Compatibilizer (d) | parts by weight | 1 | 1 | 6 |  | 1 |
| Resin Composition by 1st Kneading | parts by weight |  |  |  | 52 |  |
| Number-Average Dispersed Particle Diameter of (c) | nm | 1120 | 770 | — | — | 1005 |
| Dispersed Phases Oyer 1000 nm in (c) | % | 53.22 | 1.85 | — | — | 43.5 |
| Heat Sag Amount (0.7 mmt) | mm | 17.0 | 19.0 | — | — | 18.2 |
| Bar Flow Length (0.5 mmt) | mm | 56 | 42 | — | — | 105 |
| Material Specific Gravity | g/cm$^3$ | 1.41 | 4.42 | — | — | 1.42 |
| PPS Resin (a)/ Non-Newtonian Index N |  | 1.27 | 1.28 | — | — | 1.27 |
| Centerline Waviness Ra (1.0 mmt) | μm | 0.08 | 0.07 | — | — | 0.07 |
| Arithmetic Mean Waviness Wa (1.0 mmt) | μm | 1.02 | 1.00 | — | — | 1.01 |
| Non-Treated/Total Reflectivity (1.0 mmt) | % | 89.0 | 88.8 | — | — | 88.2 |
| Regular Reflectance (1.0 mmt) | % | 87.8 | 87.5 | — | — | 87.1 |
| Diffuse Reflectance (1.0 mmt) | % | 1.2 | 1.3 | — | — | 1.1 |
| Heat-Treated/Total Reflectivity (1.0 mmt) | % | 88.8 | 88.0 | — | — | 87.8 |
| Regular Reflectance (1.0 mmt) | % | 83.8 | 84.3 | — | — | 83.0 |
| Diffuse Reflectance (1.0 mmt) | % | 5.0 | 4.3 | — | — | 4.8 |
| After Metal Deposition/ Heat Treatment/ Appearance of Molded Product | ○, Δ, x | x | x | — | — | x |
| Falling Ball Impact Test | ○, Δ, x | ○ | ○ | — | — | x |
| Storage Modulus E'/Measurement Temp 50° C. | GPa | 4.20 | 4.18 | — | — | 4.19 |
| /Measurement Temp 80° C. | GPa | 4.15 | 4.13 | — | — | 4.15 |
| /Measurement Temp 110° C. | GPa | 2.00 | 2.01 | — | — | 1.99 |
| /Measurement Tamp 150° C. | GPa | 0.96 | 0.98 | — | — | 0.94 |
| /Measurement Temp 180° C. | GPa | 0.83 | 0.90 | — | — | 0.82 |

The following describes comparison of the results of Examples 1 to 22 and Comparative Examples 1 to 4 described above.

Compared with Comparative Example 1 without mixing the mica (b), Examples 1 to 14 produced by mixing the mica (b) having the aspect ratio of not less than 80 with the PPS resin (a) had the reduced heat sag amount, the improved high-temperature rigidity and the excellent thin-wall heat resistance and additionally caused no significant decrease in reflectance even under heat treatment after metal layer evaporation. These Examples provided a reflector by direct metal evaporation without clouding due to gas or float of fillers. Especially Examples 5 to 11 using the mica b-6 having the high aspect ratio of 133 and the small particle diameter of 10 μm had the better effect of reducing the heat sag amount and the further improvement in high-temperature rigidity. This suppressed an increase in diffuse reflectance under the high temperature environment and provided a reflector by direct metal evaporation having the extremely excellent light distribution performance and the glossy appearance. Specifically Examples 8 to 11 had the non-Newtonian index N satisfying 1.25≤N≤1.40 and accordingly had the better thin-wall heat resistance and the better surface smoothness. Examples 12 to 14 using the mica (b) having the significantly high aspect ratios of 150, 177 and 213 slightly improved the heat resistance compared with Example 5 using the mica (b) having the aspect ratio of 133, but had substantially no additional effect in improving the surface smoothness.

As described above, using the mica (b) having the aspect ratio of not less than 80 improves the thin-wall heat resistance and the high-temperature rigidity even when a relatively small amount of the mica (b) is added. These Examples accordingly maintain the substantially equivalent level of thin-wall flowability to that of Comparative Example 1 without mixing any fillers and minimize the increase in material specific gravity and the adverse effect on the surface smoothness by float of fillers. These Examples also allow for wall thinning of a molded product and are thus likely to have the light-weighting effect.

Comparative Examples 2 and 4 respectively using b-5 and b-7 having the small aspect ratios of 40 and 44 as the mica (b), on the other hand, had little effect of reducing the heat sag amount and the equivalent level of thin-wall heat resistance to that of Comparative Example 1 without mixing any fillers. With regard to Comparative Examples 2 and 4, heat treatment of a reflector after metal layer evaporation caused the high degree of clouding by float of fillers and significant reduction in regular reflectance. These Comparative Examples accordingly provided only a dull reflector. Comparative Example 3 using the increased the amount of b-5 to 35 parts by weight had a decrease in heat sag amount and improvement in thin-wall heat resistance. Addition of the large amount of the mica (b), however, deteriorated the thin-wall flowability and the material specific gravity and caused significant deterioration of the surface smoothness and reduction in falling ball impact resistance by low toughness.

Examples 15 to 19 produced by mixing the amorphous resin (c) in addition to the mica (b) having the aspect ratio of not less than 80 with the PPS resin (a) improved the surface appearance and the falling ball impact resistance as well as the heat resistance. These Examples had little changes in Ra and Wa on the surface of the molded product before and after heat treatment and maintained the good surface smoothness, thus having little change in diffuse reflectance. These Examples also suppressed deterioration of the reflectance property by heat treatment and thereby provided a glossy reflector with substantially no clouding.

Examples 20 to 22 were produced by mixing the same amount of b-6 as the mica (b) as that of Example 17 but had the relatively large heat sag amount and the reduced effect of improving the heat resistance. Compared with Example 17, Examples 20 to 22 had the greater dispersed particle diameter of the amorphous resin (c) and increased the number of dispersed phases of the amorphous resin (c) exceeding 1000 nm. This caused deterioration of the appearance after metal layer evaporation, an increased change in diffuse reflectance before and after heat treatment, and degradation of the reflectance property by heat treatment. These Examples accordingly provided only a dull reflector having a high degree of clouding by float of fillers.

The invention claimed is:

1. A polyphenylene sulfide resin composition comprising:
   1 to 30 parts by weight of a mica (b) having an aspect ratio of not less than 80, relative to 100 parts by weight of a polyphenylene sulfide resin (a), and having a volume average particle diameter of not greater than 30 μm,
   wherein the polyphenylene sulfide resin (a) has a non-Newtonian index N calculated by Equation (1) and satisfies 1.25≤N≤1.40 under a condition of an orifice L/D=10 at 320° C.:

$$SR = K \cdot SS^N \quad (1)$$

(wherein L represents length of an orifice; D represents diameter of the orifice; N represents the non-Newtonian index; SR represents a shear rate (1/second); SS represents a shear stress (dyne/cm$^2$); and K represents a constant).

2. The polyphenylene sulfide resin composition according to claim 1, wherein the mica (b) has the aspect ratio of not less than 100 and not greater than 200.

3. The polyphenylene sulfide resin composition according to claim 2, further comprising:
   1 to 100 parts by weight of at least one amorphous resin (c) selected among polyether imide resins and polyether sulfone resins; and
   1 to 30 parts by weight of a compatibilizer (d) having at least one group selected among an epoxy group, an amino group and an isocyanate group,
   wherein the polyphenylene sulfide resin forms a continuous phase (sea phase) and the amorphous resin (c) forms dispersed phases (island phases) where the amorphous resin (c) is dispersed in a number-average dispersed particle diameter of not less than 1 nm but less than 1000 nm, in morphology, and
   a number of dispersed phases having a dispersed particle diameter of not less than 1000 nm is equal to or less than 1.0% of a total number of dispersed phases.

4. The polyphenylene sulfide resin composition according to claim 1, further comprising:
   1 to 100 parts by weight of at least one amorphous resin (c) selected among polyether imide resins and polyether sulfone resins; and
   1 to 30 parts by weight of a compatibilizer (d) having at least one group selected among an epoxy group, an amino group and an isocyanate group,
   wherein the polyphenylene sulfide resin foams a continuous phase (sea phase) and the amorphous resin (c) forms dispersed phases (island phases) where the amorphous resin (c) is dispersed in a number-average dispersed particle diameter of not less than 1 nm but less than 1000 nm, in morphology, and
   a number of dispersed phases having a dispersed particle diameter of not less than 1000 nm is equal to or less than 1.0% of a total number of dispersed phases.

5. The polyphenylene sulfide resin composition according to claim 1, wherein the mica (b) has an aspect ratio of not less than 80 and not greater than 200.

6. A method of producing the polyphenylene sulfide resin composition according to claim 4, comprising melt-kneading the polyphenylene sulfide resin (a) with the amorphous resin (c) and the compatibilizer (d) and, subsequently, further melt-kneading with the mica (b).

7. A molded product produced by molding the polyphenylene sulfide resin composition according to claim 1.

8. A reflector produced by forming a metal layer on the molded product according to claim 7.

9. A molded product produced by molding the polyphenylene sulfide resin composition according to claim 2.

10. A molded product produced by molding the polyphenylene sulfide resin composition according to claim 4.

* * * * *

UNITED STATES PATENT AND TRADEMARK OFFICE
CERTIFICATE OF CORRECTION

PATENT NO. : 9,988,521 B2
APPLICATION NO. : 14/361482
DATED : June 5, 2018
INVENTOR(S) : Ouchiyama et al.

It is certified that error appears in the above-identified patent and that said Letters Patent is hereby corrected as shown below:

In Column 40
At Table 4, at the subheading "Final Composition", at row 20, please change "1.38" to -- 1.39 --.

In Column 42
At Table 5-continued, at the subheading "Final Composition", at row 6, please change "586" to -- 566 --; and at row 24, please change "4.56" to -- 4.55 --.

Signed and Sealed this
Twenty-fifth Day of December, 2018

Andrei Iancu
*Director of the United States Patent and Trademark Office*